(12) United States Patent
Bayless et al.

(10) Patent No.: US 11,915,863 B2
(45) Date of Patent: Feb. 27, 2024

(54) ADJUSTABLE MAGNETIC COUNTERBALANCE

(71) Applicant: ZABER TECHNOLOGIES INC., Vancouver (CA)

(72) Inventors: Jacob Daniel Bayless, Vancouver (CA); Graham Daniel Kerr, Vancouver (CA); Jacob William Hardes, Vancouver (CA)

(73) Assignee: Zaber Technologies Inc., Vancouver (CA)

( * ) Notice: Subject to any disclaimer, the term of this patent is extended or adjusted under 35 U.S.C. 154(b) by 511 days.

(21) Appl. No.: 17/309,599

(22) PCT Filed: Jan. 31, 2020

(86) PCT No.: PCT/CA2020/050118
§ 371 (c)(1),
(2) Date: Jun. 9, 2021

(87) PCT Pub. No.: WO2020/154816
PCT Pub. Date: Aug. 6, 2020

(65) Prior Publication Data
US 2022/0037070 A1    Feb. 3, 2022

Related U.S. Application Data

(60) Provisional application No. 62/800,348, filed on Feb. 1, 2019.

(51) Int. Cl.
*H01F 7/02* (2006.01)
(52) U.S. Cl.
CPC ......... *H01F 7/0242* (2013.01); *H01F 7/0236* (2013.01)

(58) Field of Classification Search
CPC .... H01F 7/0236; H01F 7/0242; H01F 7/0231; H02N 15/00
See application file for complete search history.

(56) References Cited

U.S. PATENT DOCUMENTS 3,332,045 A    7/1967  Rodaway
3,427,576 A    2/1969  Vincent
(Continued)

FOREIGN PATENT DOCUMENTS

CA    1177530 A      11/1984
CN    201436604 U    4/2010
(Continued)

OTHER PUBLICATIONS

"Adjustable passive magnetic constant force actuator", Dover Motion, https://dovermotion.com/wp-content/uploads/2015/12/Adjustable-Passive-Magnetic-Constant-Force-Actuator.pdf, 2015.
(Continued)

*Primary Examiner* — Mohamad A Musleh
(74) *Attorney, Agent, or Firm* — Oyen Wiggs Green & Mutala LLP; Nicholas Garner

(57) ABSTRACT

A passive magnetic constant-force apparatus comprises a geometry and arrangement of permanent magnets, ferromagnetic components, and non-magnetic structural components. The apparatus is easily and precisely adjustable, cost-effective, with a high load capacity, and with minimal parasitic forces. The apparatus is suitable for use as a counterbalance for vertical linear motion applications and may be integrated with or attached to a linear motion stage.

79 Claims, 19 Drawing Sheets

(56) References Cited

U.S. PATENT DOCUMENTS

| | | | |
|---|---|---|---|
| 3,818,596 | A | 6/1974 | Stemple et al. |
| 4,216,454 | A | 8/1980 | Ohtani et al. |
| 4,368,501 | A | 1/1983 | Gingrich |
| 5,780,943 | A * | 7/1998 | Ono .................... G03F 7/70691 |
| | | | 310/90.5 |
| 6,002,184 | A | 12/1999 | Delson et al. |
| 6,175,178 | B1 | 1/2001 | Tupper et al. |
| 6,501,357 | B2 | 12/2002 | Petro |
| 6,785,498 | B2 | 8/2004 | Manno |
| 6,954,041 | B2 | 10/2005 | Korenaga |
| 7,317,266 | B2 | 1/2008 | Beakley et al. |
| 8,330,317 | B2 | 12/2012 | Burch et al. |
| 8,803,392 | B2 * | 8/2014 | Aronstam ............. F16C 39/063 |
| | | | 310/90.5 |
| 9,754,711 | B2 | 9/2017 | Janssen et al. |
| 2003/0155882 | A1 | 8/2003 | Ono et al. |
| 2004/0001188 | A1 | 1/2004 | Janssen et al. |
| 2004/0164470 | A1 | 8/2004 | Korenaga |
| 2009/0278642 | A1 * | 11/2009 | Fullerton ............. H01F 13/003 |
| | | | 335/284 |
| 2011/0018665 | A1 * | 1/2011 | Fullerton ............... H02K 49/10 |
| | | | 335/306 |
| 2011/0109895 | A1 | 5/2011 | Homma |
| 2015/0364238 | A1 * | 12/2015 | Fullerton ................ E05C 19/16 |
| | | | 335/306 |
| 2018/0083522 | A1 | 3/2018 | Huard |

FOREIGN PATENT DOCUMENTS

| | | | |
|---|---|---|---|
| CN | 106953551 A | 7/2017 | |
| CN | 105988304 B | 10/2018 | |
| CZ | 25603 U1 | 7/2013 | |
| CZ | 2013102 A3 | 8/2014 | |
| EP | 1320178 A1 | 6/2003 | |
| EP | 1882983 A1 | 1/2008 | |
| GB | 2459273 A1 | 10/2009 | |
| JP | 2012511821 A | 5/2012 | |
| JP | 5058546 B2 | 10/2012 | |
| KR | 101394258 B1 | 5/2014 | |
| WO | WO-9904481 A1 * | 1/1999 | ......... G03F 7/70758 |
| WO | 2018166745 A1 | 9/2018 | |

OTHER PUBLICATIONS

Min-MAG Positioning Products, Miniature Linear Stage, Dover Motion, https://dovermotion.com/wp-content/uploads/2015/10/MMX_MMG_Miniature_Linear_Stage.pdf, 2015.

MagSpring—Magnetic Springs, Linmot Product brochure, Jul. 29, 2008.

https://www.parker.com/literature/Electromechanical%20North%20America/CATALOGS-BROCHURES/mSR%20Literature/mSR%20Catalog%205.20.2015.pdf, 2015.

* cited by examiner

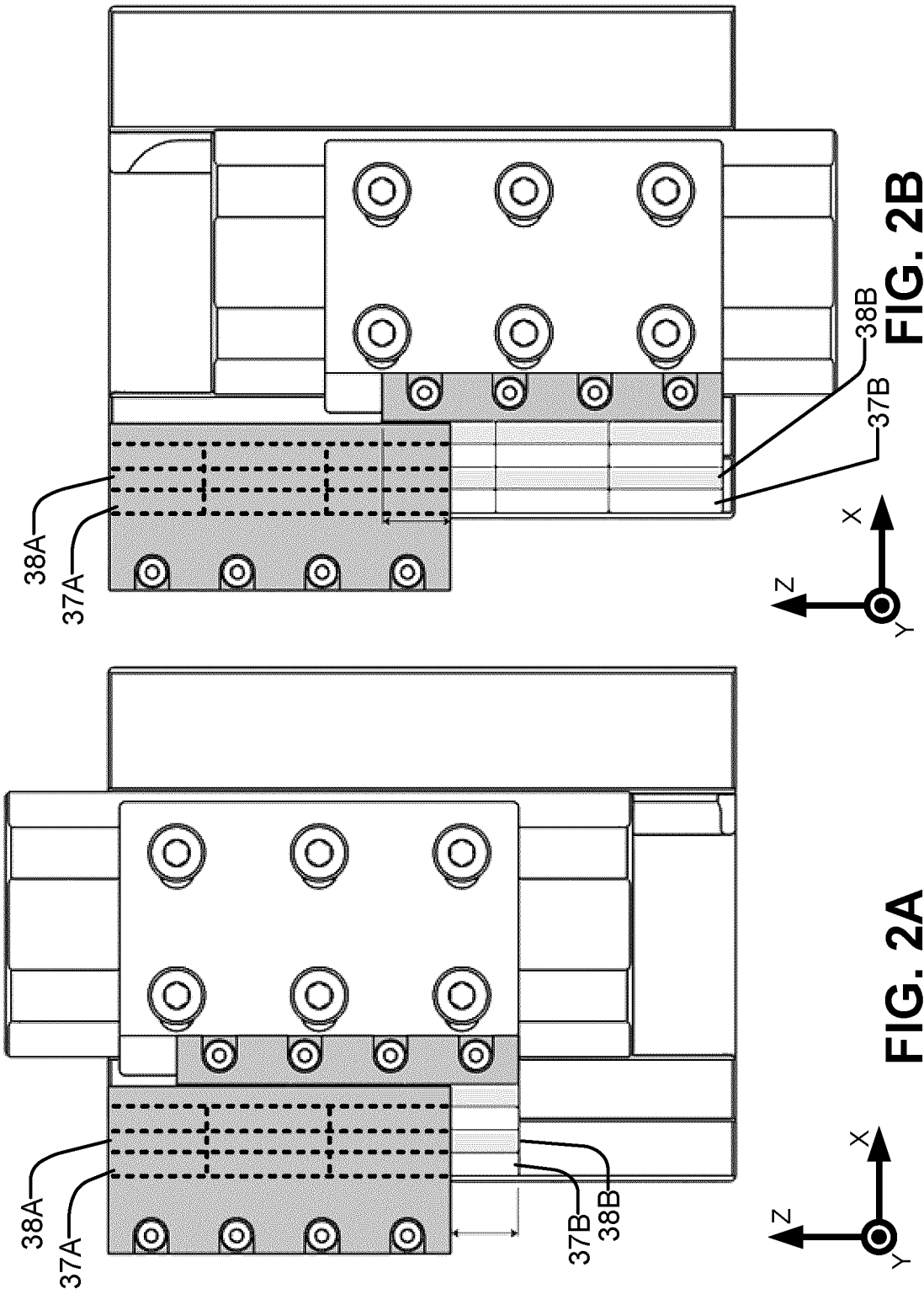

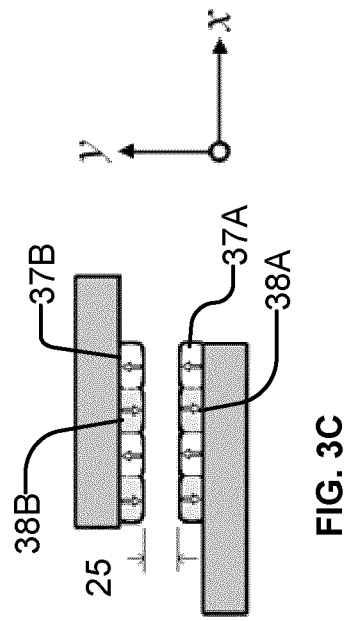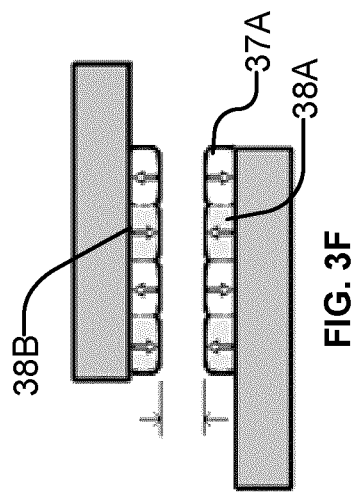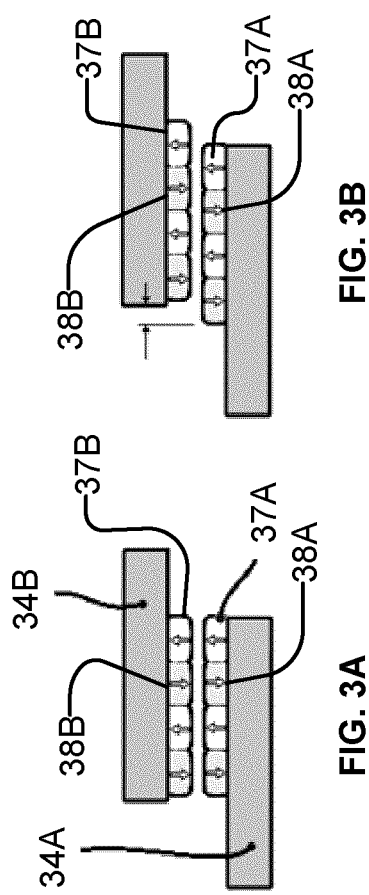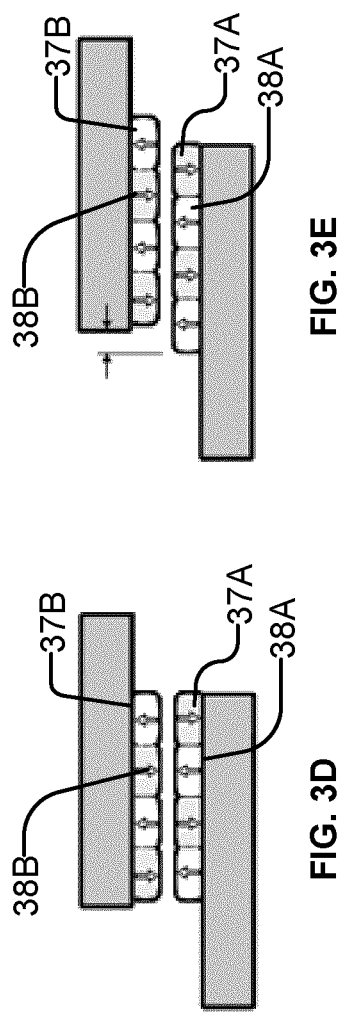

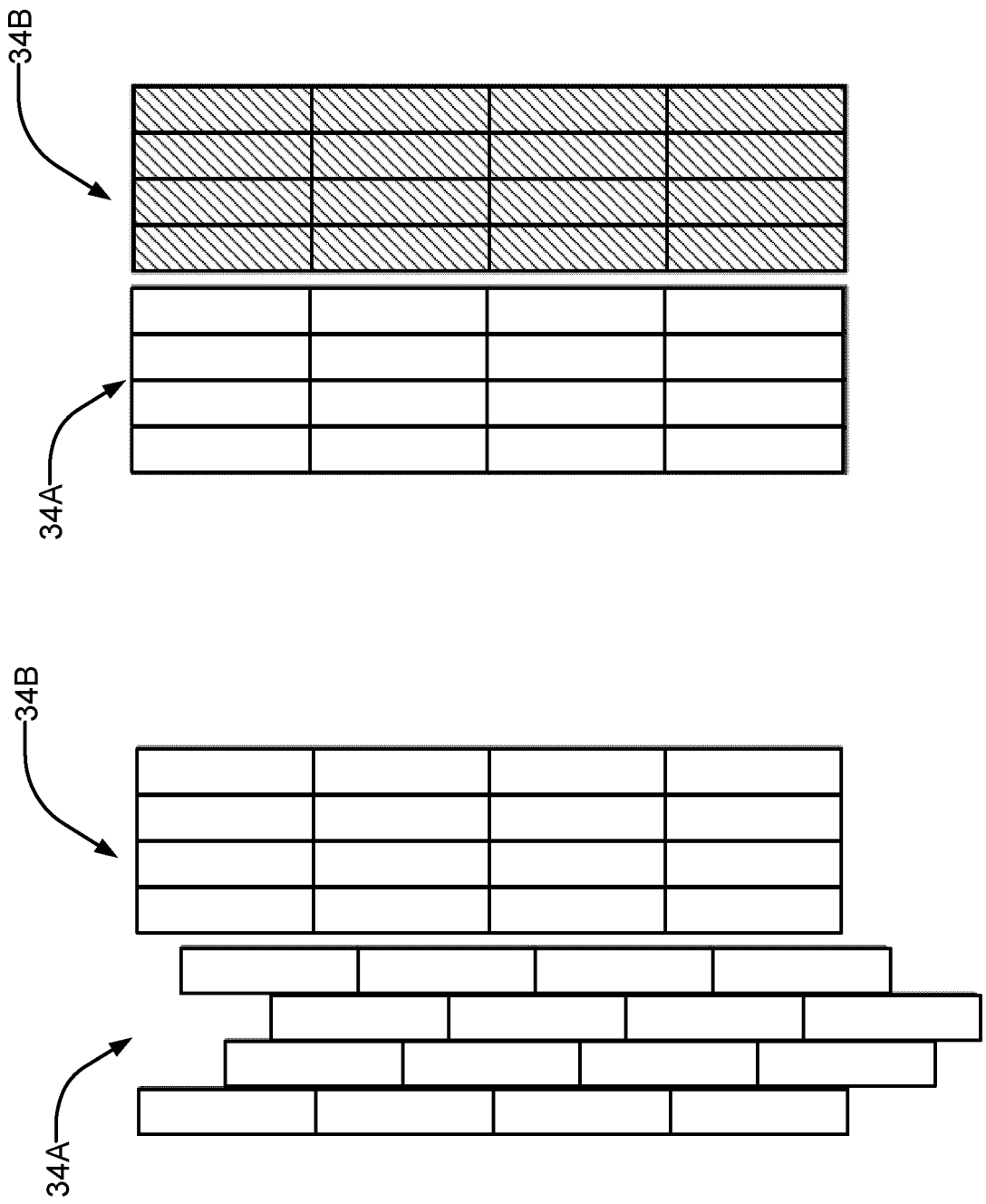

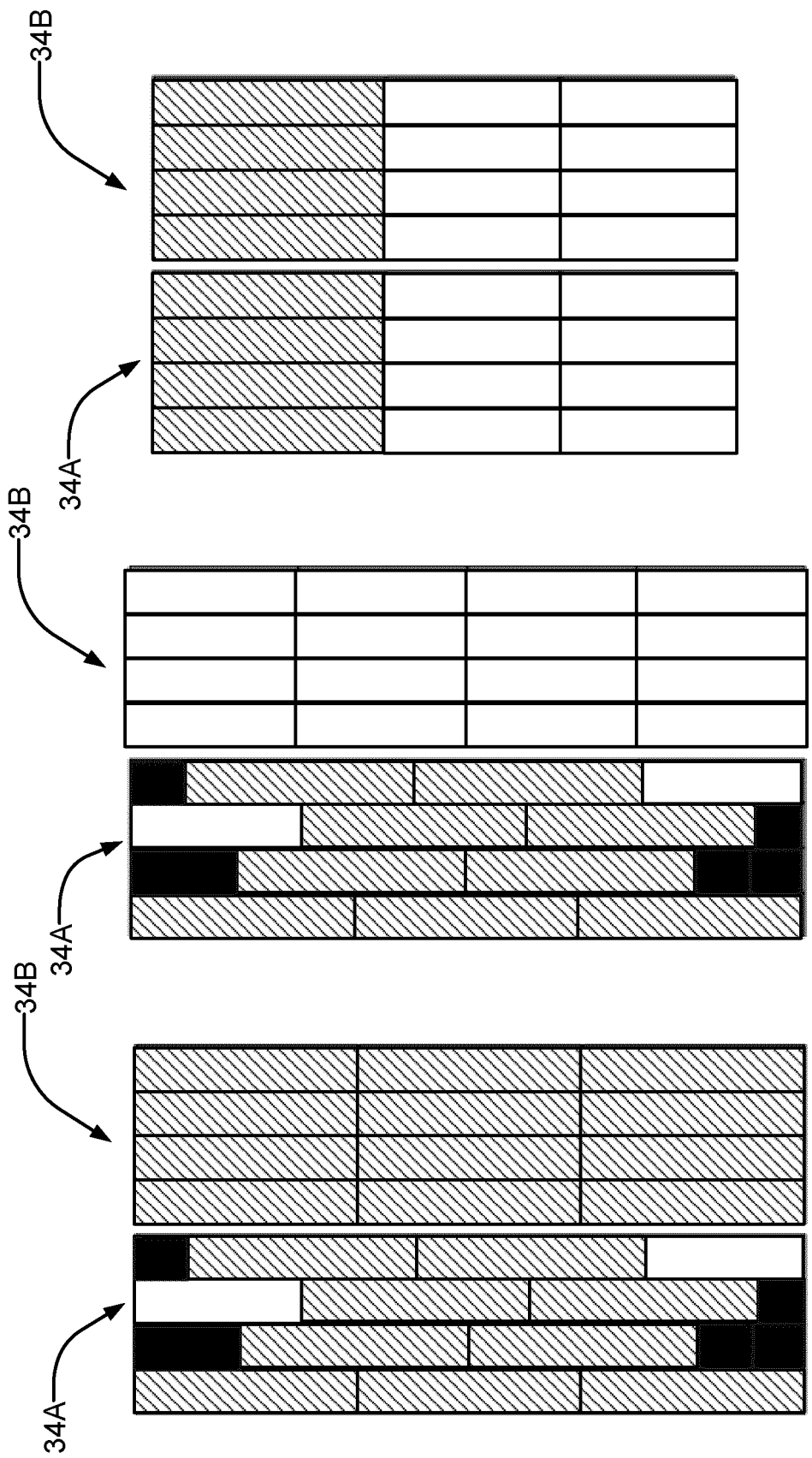

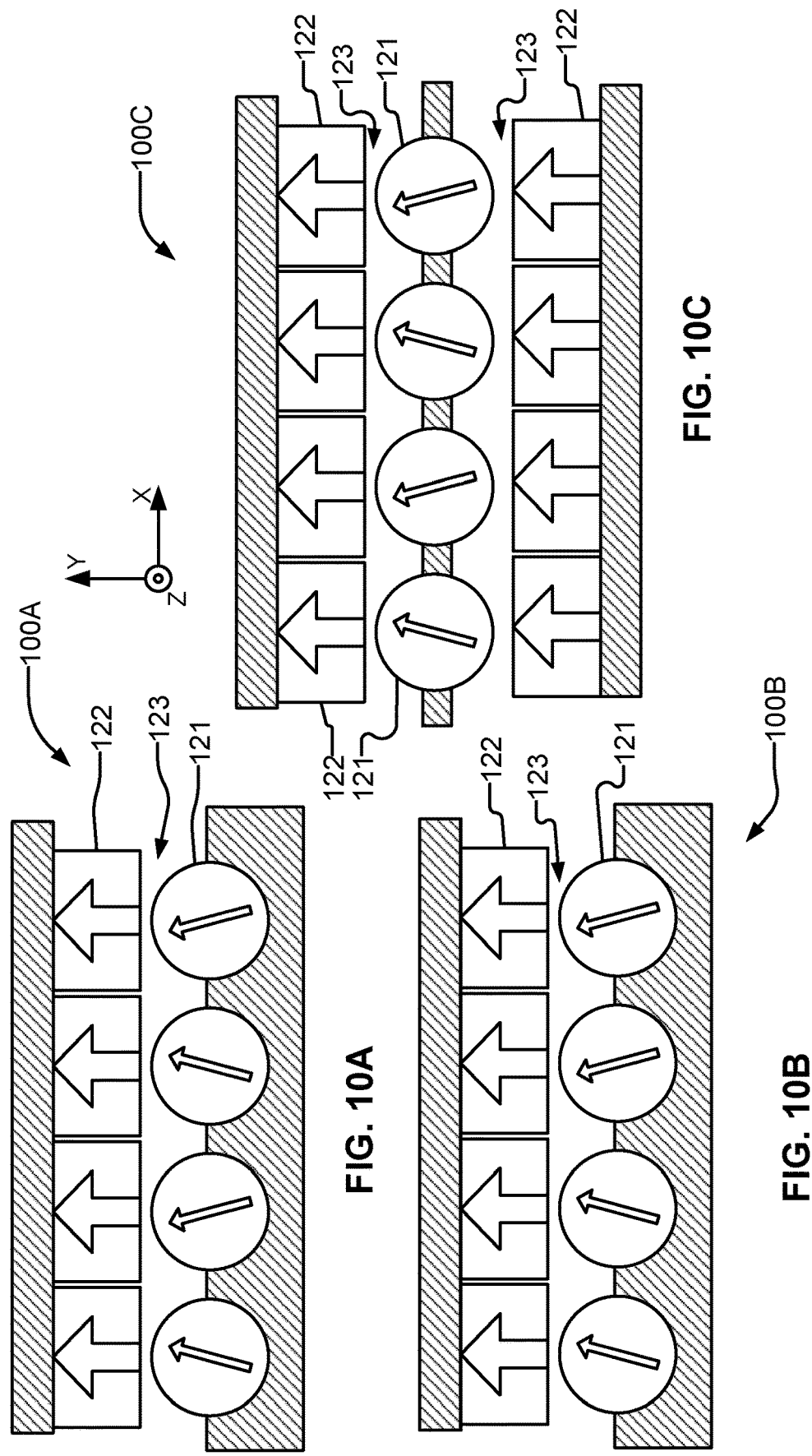

ADJUSTABLE MAGNETIC COUNTERBALANCE

CROSS-REFERENCE TO RELATED APPLICATIONS

This application claims the benefit under 35 U.S.C. § 119 of U.S. application No. 62/800,348 filed 1 Feb. 2019 and entitled ADJUSTABLE MAGNETIC COUNTERBALANCE FOR LINEAR MOTION which is hereby incorporated herein by reference for all purposes.

FIELD

The present invention relates to mechanisms for applying constant forces to objects. Such mechanisms have example application as linear counterbalances or gravity compensators. Some embodiments provide linear motion systems that include constant force mechanisms.

BACKGROUND

There are various applications in which it is useful to apply a constant force to an object. Some such applications seek to apply a force that fully or partly counterbalances the weight of an object. Consider, for example the case of a system operable to move an object along a vertical trajectory and to hold the object at a desired position. Providing a counterbalance that supports the weight of the object facilitates control of the motion of the object along the trajectory and facilitates holding the object at a desired position along the trajectory. Counterbalances are commonly used in apparatus such as semiconductor lithography equipment and coordinate measuring machines.

The following references describe various types of counterbalances: U.S. Pat. No. 3,818,596A, EP1320178A1, CN201436604U, US20040001188A1, EP1882983A1, US20030155882A1, U.S. Pat. No. 3,427,576A, KR101394258B1, U.S. Pat. No. 6,002,184A, JP2012511821A, CN106953551A, CN105988304B, WO2018166745A1.

Despite the current depth of knowledge regarding counterbalances and other constant force apparatus there remains a need for additional options for counterbalancing and other applications which require application of a constant force to an object that are practical and cost effective.

SUMMARY

This invention has a number of aspects.

One aspect of the invention provides linear motion systems comprising passive magnetic counterbalances.

Another aspect of the invention provides passive magnetic counterbalances which exert a substantially constant force on a load as the load is urged to move along a linear axis of travel by a drive mechanism.

Another aspect of the invention provides passive magnetic counterbalances which can be configured to exert different amounts of force on a load by adjusting the spacing and/or interaction area between the magnets of the magnetic counterbalance.

Another aspect of the invention provides apparatuses which apply a force on an object. The apparatuses may comprise first and second parts that are movable relative to one another in a direction of motion. The first and second parts each comprise one or more permanent magnets arranged to provide one or more magnetic poles that are elongated and oriented parallel to the direction of motion. The polarization of magnetic fields provided by the permanent magnets is substantially uniform along each of the magnetic poles in the direction of motion. The magnetic poles of the first part and the second part are arranged facing one another, spaced apart by a gap, and for a range of travel along the direction of motion. One end of each of the magnetic poles of the first part is located between opposing ends of corresponding magnetic poles of the second part in the direction of motion. One end of each of the magnetic poles of the second part is located between opposing ends of corresponding magnetic poles of the first part in the direction of motion. This arrangement allows the interaction of the magnetic fields of the permanent magnets of the first and second parts to cause the first part to be forced toward or away from the second part in the direction of motion. The magnetic poles of the first and second parts may be movable relative to one another in a direction different from the direction of motion to vary a magnitude of the generated force. In some embodiments the relative movement is such as to alter a width of the gap. In some embodiments the relative movement is such as to alter an alignment of the poles in a direction transverse to the direction of motion.

In some embodiments, each of the first and second parts comprises a set of the magnetic poles extending parallel to one another and parallel to the direction of motion. On each of the first and second parts, one or more of the magnetic poles may be polarized north and one or more of the magnetic poles may be polarized south. On each of the first and second parts, one or more north polarized magnetic poles may be interleaved with the one or more south polarized magnetic poles. In some embodiments, each of the first and second parts the magnetic poles are regularly spaced in a direction transverse to the direction of motion by a pitch distance.

In some embodiments, the first part and/or second part are adjustably mounted such that a width of the gap may be set. In some embodiments, the first part is movable relative to the second part in a direction transverse to the direction of motion and transverse to the gap such that an alignment between the magnetic poles of the first part and the magnetic poles of the second part is adjustable.

In some embodiments, the direction of motion is parallel to a z axis, a y axis is directed across the gap and an x axis is orthogonal to the y and z axes. The relative position between the permanent magnets of the first part and the permanent magnets of the second part may be adjustable along the x-axis. The size of the gap be also be adjustable. In some embodiments, one or more magnetic poles of the first part are coplanar. In some embodiments, one or more magnetic poles of the second part are coplanar.

In some embodiments, the first part comprises a generally C-shaped support defining first and second surfaces that face one another. In these embodiments, some of the magnetic poles of the first part are arranged on the first surface, some of the magnetic poles of the first part are arranged on the second surface and the magnetic poles of the second part are arranged between the first and second surfaces.

In some embodiments, the magnetic poles of the first and second parts are arranged in a plurality of groups. In each of the groups, interaction of magnetic fields of the magnetic poles of the first and second parts within the group cause a force in the direction of motion and a force in a direction transverse to the direction of motion wherein the forces in the direction of motion for the groups of magnetic poles are parallel and add and the forces in the direction transverse to the direction of motion for the groups are anti-parallel and at least partially cancel. In each of the groups, the magnetic poles of the first part may be supported by a generally C-shaped support, the magnetic poles of the second part are located between opposing surfaces of the C-shaped support and the C-shaped supports are oriented to face in opposing directions.

In some embodiments, a first set of the magnetic poles of the first part are circumferentially spaced apart around a bore having a longitudinal axis extending in the direction of motion and a second set of the magnetic poles of the second part are circumferentially spaced apart around a longitudinal centerline of the first bore and supported to project into the first bore. The first set of magnetic poles of the first part may be provided by a number N which is four or more magnetic poles that are equally angularly spaced around the first bore. The second set of magnetic poles of the second part may be provided by N magnetic poles that are equally angularly spaced apart around the first bore. The second set of magnetic poles of the second part may be rotatable relative to the first set of magnets of the first part that about a rotation axis that is concentric with the first bore. In some embodiments, an adjustment mechanism (i.e. a worm gear set) is operable to rotate the second set of magnetic poles of the second part relative to the first set of magnets of the first part around the rotation axis.

In some embodiments, the magnetic poles of the first part comprises multiple magnetic poles and the magnetic poles abut one another to provide a contiguous magnetic surface. In some embodiments, each of the magnetic poles of the first part comprises multiple first magnets arranged side by side to extend along the direction of motion and each of the magnetic poles of the second part comprises multiple second magnets arranged side by side to extend along the direction of motion where the first magnets and second magnets have different dimensions in the direction of motion. In some embodiments, the first magnets are made up of a first number of magnets and the second magnets are made up of a second number of magnets and the first number and the second number are relatively prime. In some embodiments, each of the magnetic poles of the first part comprises multiple first magnets arranged side by side and each of the magnetic poles of the second part comprises multiple second magnets arranged side by side. When a boundary between two adjacent first magnets is aligned in the direction of motion with a boundary between two adjacent second magnets, then no other boundary between adjacent first magnets is aligned in the direction of motion with any boundary between two adjacent second magnets.

In some embodiments, the permanent magnets of at least one of the first part and the second part are supported on a backing member. The backing member may comprise a ferromagnetic material. The permanent magnets may be received in one or more recesses formed in a face of the backing member. The backing may comprise a metal plate. The backing may comprise nickel plated steel.

In some embodiments, the permanent magnets of at least one of the first and second parts are configured as a Halbach array. In some embodiments a force applied in the direction of motion on the second part as a result of interaction of magnetic fields from the permanent magnets of the first and second parts is constant over a range of motion of the stage within ±10%.

In some embodiments, movement of the second part in the direction of motion causes an elevation of the second part to change and the polarities of the permanent magnets are selected such that interaction of magnetic fields of the magnets causes a net force on the second part in the direction of motion that at least partially compensates for a gravitational force acting on the second part. The first and second parts may be arranged such that the direction of motion is substantially vertical. The net force on the second part may be substantially equal to a gravitational force on the second part and an object supported by the second part.

In some embodiments, the first and second parts comprise first and second parts of a stage that are slidable relative to one another in the direction of motion. The stage may comprise bearings arranged between the first and second parts. The stage may comprise a motor driven linear actuator connected between the first and second parts and operable to move the second part relative to the first part along the direction of motion. The linear actuator may comprise a ball screw or a linear motor. The linear actuator may comprise a mechanical transmission coupling a motor to move the second part relative to the first part and the mechanical transmission has a mechanical efficiency of at least 70%. In some embodiments, the force applied in the direction of motion on the second part as a result of interaction of magnetic fields from the permanent magnets of the first and second parts exceeds a maximum sustainable force of the linear actuator. In some embodiments, the second part is coupled to apply force to an object. The second part may be coupled to the object by way of a linkage. The linkage may be arranged to provide a mechanical advantage. The linkage may comprise a lever. The linkage may comprise a block and tackle.

Another aspect provides apparatus for applying a force to an object. The apparatus comprises a translator and a stator. The translator is constrained to move in a direction of motion. The stator is fixed. The translator comprises a first array of permanent magnets arranged to form a multipolar magnet array comprising a plurality of magnetic poles lying on a first surface. The magnetic poles of the translator extend along the first surface in the direction of motion. The permanent magnets of the first array have polarizations directed transverse to the first surface and the direction of motion. The polarization of the permanent magnets of the first array is substantially uniform along the direction of motion and alternates in orientation at regular intervals when traversing the first surface in a transverse direction orthogonal to the direction of motion. The stator is located adjacent to the translator and comprises a second permanent magnet assembly comprising a second array of permanent magnets that overlaps in the direction of motion with the first array of permanent magnets. The second array of permanent magnets is arranged to form a multipolar magnet array comprising magnetic poles extending along a second surface in the direction of motion. The second surface is parallel to and spaced apart from the first surface by a gap. The permanent magnets of the second array have a polarization that is substantially uniform along the direction of motion and alternates in orientation at regular intervals when traversing the second surface in the transverse direction. The apparatus includes an adjustment mechanism for adjusting a force applied to the object as a result of interaction of the magnetic fields of the first and second arrays. The adjustment mechanism is operable to one or both: move the first array relative to the second array in the transverse direction and move the first array toward or away from the second array.

In some embodiments the first and second surfaces are cylindrical surfaces (where a flat or planar surface can be considered an example of a cylindrical surface which has an infinite radius of curvature).

Another aspect provides a method for providing a force to an object, the method comprises coupling the object to a translator constrained to move in a direction of motion where the translator comprises a first array of permanent magnets arranged to form a multipolar magnet array comprising a plurality of magnetic poles lying on a first surface. The magnetic poles extend along the first surface in the direction of motion. The permanent magnets of the first array have polarizations directed transverse to the direction of motion. The polarization of the permanent magnets of the first array is substantially uniform along the direction of motion and alternates in orientation at regular intervals when traversing the first surface in a transverse direction orthogonal to the direction of motion. The translator is arranged adjacent to a fixed stator that includes a second permanent magnet assembly comprising a second array of permanent magnets that overlaps in the direction of motion with the first array of permanent magnets and is arranged to form a multipolar magnet array comprising magnetic poles extending along a second surface in the direction of motion. The permanent magnets of the second array have a polarization that is substantially uniform along the direction of motion and the polarization of the permanent magnets of the second array alternates in orientation at regular intervals when traversing the second surface in the transverse direction. The method involves adjusting a force applied to the object as a result of interaction of the magnetic fields of the first and second arrays by one or both of moving the first array relative to the second array in the transverse direction and moving the first array toward or away from the second array.

In some embodiments the first and second surfaces are flat surfaces and the method comprises translating one or both of the first and second arrays to alter alignment of the poles of the first array of permanent magnets with the poles of the second array of permanent magnets. In some embodiments the first and second surfaces are cylindrical surfaces concentric about an axis and the method comprises rotating one or both of the first and second surfaces about the axis to alter alignment of the poles of the first array of permanent magnets with the poles of the second array of permanent magnets.

Another aspect provides a linear motion system comprising a stage powered by a motor to move relative to a base between first and second positions spaced apart by a travel distance along a linear z-axis. A translator is mechanically coupled to the stage, the translator constrained to move with the stage along the linear z-axis, the translator comprising a first permanent magnet assembly comprising a plurality of first permanent magnets arranged to provide plural first magnetic poles, the first magnetic poles each extending parallel to the z axis for a distance at least equal to the travel distance and having uniform polarization along the linear z-axis. A stator is mechanically coupled to the base and comprises a second permanent magnet assembly comprising a plurality of second permanent magnets arranged to provide plural second magnetic poles, the second magnetic poles each extending parallel to the z axis for a distance at least equal to the travel distance and having uniform polarization along the linear z-axis wherein the stator and translator are located adjacent to one another so that the magnetic poles of the translator overlap with the magnetic poles of the translator in a direction along the z axis and are spaced apart from the magnetic poles of the stator by a gap. "Wherein the mechanical coupling of one or both of the first and second permanent magnet assemblies is adjustable to move the first and second permanent magnet assemblies relative to one another in a direction that is transverse to the Z axis such that alignment of the magnetic poles of the stator with magnetic poles of the translator is changed by adjusting the mechanical couplings.

It is emphasized that features, functions, elements and/or steps, which are described above and in the following with reference to one aspect or embodiment or implementation of the invention or disclosure, equally apply to any other aspect of the invention or disclosure described above and in the following. Particularly, features and/or elements, as described above and in the following with reference to the apparatus according to the first aspect, equally apply to the method according to the second aspect, and/or the apparatus according to the third aspect, and vice versa.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

FIGS. 2A-2B are side views of the exemplary magnetic counterbalance shown in FIG. 2.

FIGS. 3A-3F depict various possible configurations between a stator and a translator of a magnetic counterbalance.

FIGS. 8A-8E depict various example ways to stagger magnets of a stator and/or a translator to reduce cogging forces.

FIGS. 10A, 10B and 10C are cross sectional schematic views of example apparatuses which include rotatable magnetic assemblies.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figures 1, 1A:
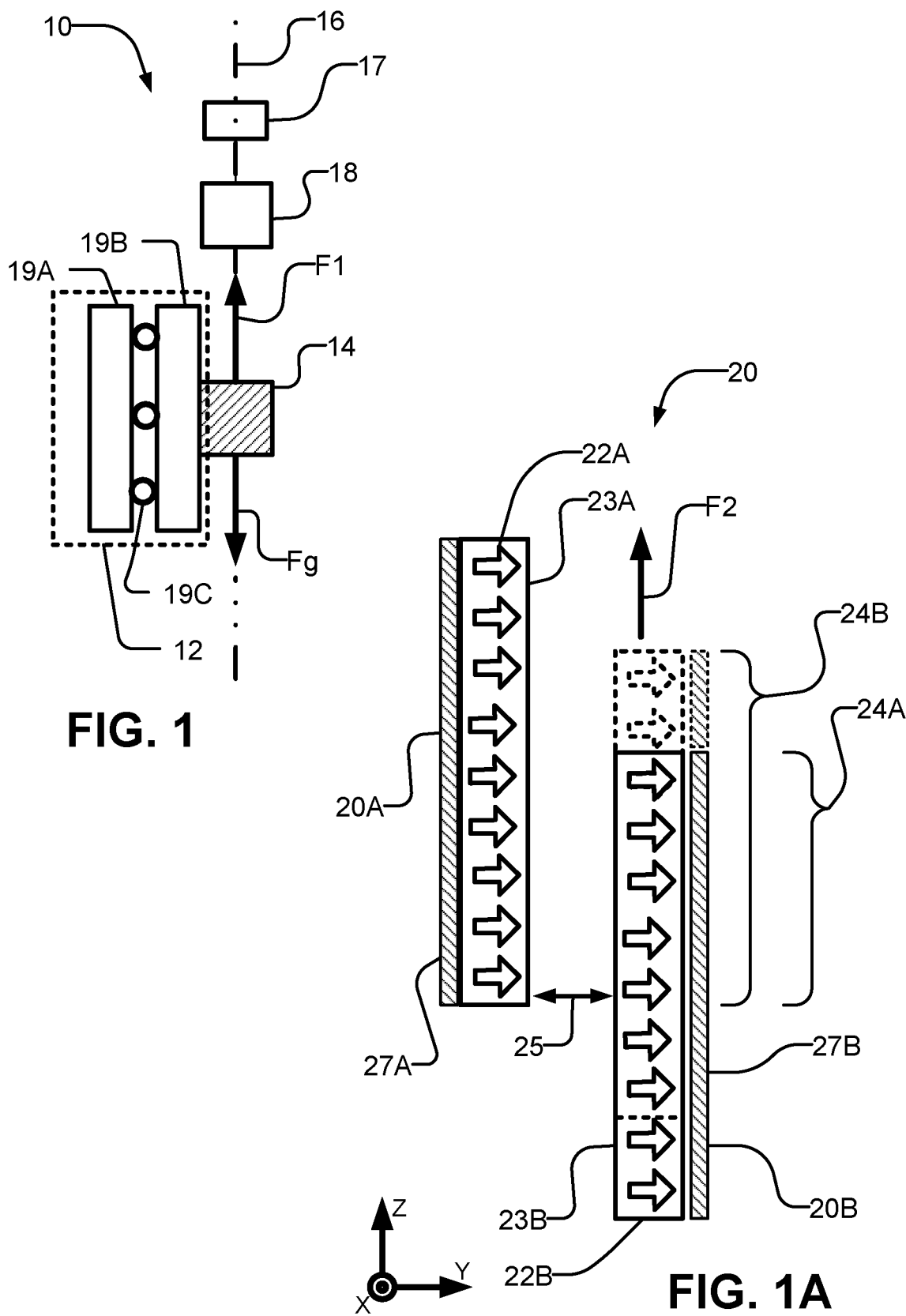
FIG. 1 is a schematic diagram illustrating a linear motion system according to an example embodiment of the invention.
FIGS. 1A-1D are schematic views of various example constant force mechanisms.

FIG. 1 is a schematic diagram illustrating a linear motion system 10 according to an example embodiment of the invention. System 10 comprises a linear actuator 12 connected to move an object 14 along a trajectory 16. A constant force apparatus 18 is connected between object 14 and an anchor 17. In some embodiments anchor 17 is integrated with or attached to linear actuator 12. In some embodiments anchor 17 is separate from linear actuator 12.

In some embodiments linear actuator 12 comprises a stage 19 having first and second parts 19A and 19B that are slidably mounted to one another. First and second parts 19A, 19B may be coupled together in a way that constrains relative motion of the first and second parts to follow trajectory 16 to a desired degree of precision. The coupling between first and second parts 19A, 19B may comprise low-friction bearings 19C such as rollers, ball bearings, air bearings etc. In some embodiments constant force apparatus 18 is connected between parts 19A and 19B of stage 19.

Constant force apparatus 18 applies a force to object 14. In this example application the force F1 applied to object 14 by constant force apparatus 18 is directed vertically. As such, force F1 is opposite in direction to the force of gravity Fg acting on object 14. Where force F1 is equal in magnitude to gravitational force Fg the force of gravity is completely compensated by constant force apparatus 18.

In system 10, linear actuator 12 may be of any suitable type. For example, the linear actuator may comprise:
- a screw actuator (i.e. an actuator in which the object is moved by turning a screw relative to a nut either or both of the screw and nut may rotate relative to the object). Ball screws and lead screws are example types of screw actuator.
- a linear motor.
- an actuator in which the object is moved by a tensioned flexible element such as a chain or cable.
- a rack and pinion mechanism.
- a pneumatic or hydraulic actuator.
- etc.

In some embodiments linear actuator 12 comprises a motor 12A (see e.g. FIGS. 2C and 2D) arranged to drive motion of object 14 by way of a high-efficiency transmission. FIG. 2C shows the example case where a transmission includes a belt 12B. FIG. 2D shows the example case where a transmission includes a ball screw 12C.

The high-efficiency transmission may be back-drivable (i.e. if a large enough force is applied to object 14 then the force can act on a motor by way of the transmission to overpower the motor and cause it to accelerate). The high efficiency transmission may, for example, have an efficiency of 50% or more. High efficiency transmissions may, for example comprise belt drives, ballscrews, or direct-drive actuation such as by linear motors. Such high efficiency transmissions may have efficiencies of 80% or higher. For example, efficiencies in the range of 85% to 95% may be achieved. In such embodiments the inclusion of constant force mechanism 18 may reduce the forces carried by a transmission to a motor by compensating for all or part of the weight of object 14.

In system 10, object 14 may be any object that it is desired to move using linear actuator 12. For example, object 14 may comprise a machine component, a sensor, a workpiece, etc. Object 14 may include part of linear actuator 12. For example, if linear actuator 12 comprises a stage that movably positions an object then the portion of the stage that moves with the object *e.g. stage part 19B) may be considered to be part of object 14. Constant force apparatus 18 may counterbalance the weight of the object and the part of the stage to which the object is attached.

Constant force apparatus 18 is configured such that the force exerted on object 14 by constant force apparatus 18 may be kept substantially constant as object 14 is moved to different positions along trajectory 16. For example, the applied force may be constant to within ±10% or ±5% or ±2% or ±1% or ±½% of a nominal value as object 14 is moved along trajectory 16 for the full range of motion experienced during normal operation of system 10.

In some embodiments, the applied force is constant to within 10% of the force capability (i.e. the maximum sustainable force that can be delivered in normal operation without damage) of linear actuator 12. In some embodiments, the applied force is constant to within 10% of the force capability of constant force apparatus 18. In some embodiments, the applied force is constant to within 10% of the lesser of the force capability of linear actuator 12 and the force capability of constant force apparatus 18.

In some embodiments, the constant force apparatus 18 is operable to generate a force that is greater than the maximum force that linear actuator 12 can apply. In some embodiments, constant force apparatus 18 can advantageously allow linear actuator 12 to move object 14 in situations where object 14 is too heavy to be moved by linear actuator 12 alone.

In some embodiments, the applied force is constant to within a frictional drag force (e.g. ~2N) between first and second parts 19A and 19B of stage 19.

In some embodiments, actuator 12 is controlled by a servo controller and the rate that the force applied by constant force apparatus 18 changes with position is small enough that the servo controller can compensate for the changes in the applied force while maintaining the position and speed and acceleration of object 14 within a specified tolerance (e.g. ±1% or ±5% or ±10% of set values). For example, for a maximum speed at which linear actuator 12 is to be operated the force provided by constant force apparatus 18 may vary at a rate that the servo controller can compensate for within the servo bandwidth of the servo controller driving linear actuator 12.

In some embodiments, constant force apparatus 18 is configured to exert a substantially constant force, as described above, on object 14 while object 14 is moved through distances of about 5 mm or more or about 300 mm or more.

Preferably, constant force mechanism 18 comprises a passive device that requires no electrical power to operate and/or does not require a connection to an external source of electricity, compressed air or other supply. For example, the force applied to object 14 by constant force mechanism 18 may be provided by the interactions of magnetic fields of permanent magnets.

FIG. 1A schematically illustrates a very simple example apparatus 20 which can operate as a constant force mechanism according to an example embodiment. Apparatus 20 may be used to provide constant force mechanism 18 in embodiments having the general arrangement shown in FIG. 1.

Apparatus 20 comprises first and second parts that are movable relative to one another. These parts are a stator 20A and a translator 20B. Translator 20B is coupled directly or indirectly to an object to which a force is to be applied (e.g. object 14 of FIG. 1). Stator 20A is anchored. For example, stator 20A may be coupled to a first part 19A of a stage 19 and translator 20B may be coupled to a second part 19B of stage 19.

Translator 20B is movable relative to stator 20A in a direction. For ease of explanation, this direction will be referred to as the "Z" direction. The direction of relative motion of translator 20B and stator 20A may, for example, be defined by a linear bearing structure that is integrated into mechanism 20 and constrains the relative motion, or by rigid connection of stator 20A and translator 20B to different parts of a second structure that already contains bearings defining a motion axis, such as a linear stage.

Stator 20A comprises a magnet 22A that has a pole 23A. Pole 23A is elongated in the Z direction (e.g. parallel to axis 16)

Translator 20B comprises a magnet 22B that has a pole 23B. Pole 23B is elongated in the Z direction. Pole 23B is spaced apart from pole 23A by a gap 25. Preferably gap 25 is small (e.g. not exceeding about 6 mm). For example, gap 25 may be in the range of 0.1 mm to 5 mm or 0.5 mm to 2.5 mm. Gap 25 is preferably smaller than widths of magnets 22A and 22B (in a direction perpendicular to the Z direction (e.g. X direction in FIG. 1A)).

Over a range of positions of pole 23B for which it is desired that mechanism 20 provides constant force, pole 23B partially overlaps with pole 23A in the Z direction such that one end of pole 23B is located between opposing ends of pole 23A. FIG. 1A, shows two positions for translator 20B, one in solid lines and one in dashed lines. In the solid line position pole 23B overlaps with pole 23A for distance 24A along the Z direction. In the dashed line position pole 23B overlaps with pole 23A for distance 24B along the Z-direction.

In mechanism 20, the poles 23A and 23B have opposite polarities. For example, pole 23A is shown as being a north pole, N, while pole 23B is shown as being a south pole, S. These polarities could both be reversed without affecting operation of mechanism 20.

With this polarity of magnets 22A and 22B mechanism 20 exerts a force F2 on translator 20B. Force F2 is parallel to the Z direction and is oriented to increase the overlap between pole 23A and pole 23B. The magnitude of force F2 can be substantially constant through a range of motion of translator 20B in the Z direction.

The magnitude of force F2 can be expressed as dE/dZ where E is the energy of the magnetic field produced by magnets 22A and 22B. In general, E is reduced when the overlap between magnet 22A and 22B increases. If the flux density at poles 23A and 23B does not vary significantly as a function of Z then for a range of motion of magnet 22B relative to magnet 22A dE/dZ does not vary significantly with Z and so F2 is essentially constant.

Another way to explain the operation of apparatus 20 is that the magnets of stator 20A and translator 20B attract one another. In addition, if the stator and translator are not fully overlapping in the direction of travel, a shear force is developed by the magnets. This shear force is almost constant over the full range of travel, diminishing only when the stator and translator are either close to fully overlapping or close to being fully separated (i.e. close to not overlapping at all in the direction of travel). It is this shear force that provides the primary force of the constant-force actuator. In order to achieve a maximally constant shear force, the stator and translator can both be made slightly longer than the intended travel distance, and positioned so that they never fully overlap nor fully separate across a full designed for range of travel, as illustrated in FIG. 2A. At the limits of device travel, the translator and stator partially overlap in the direction of travel.

Figure 1B:
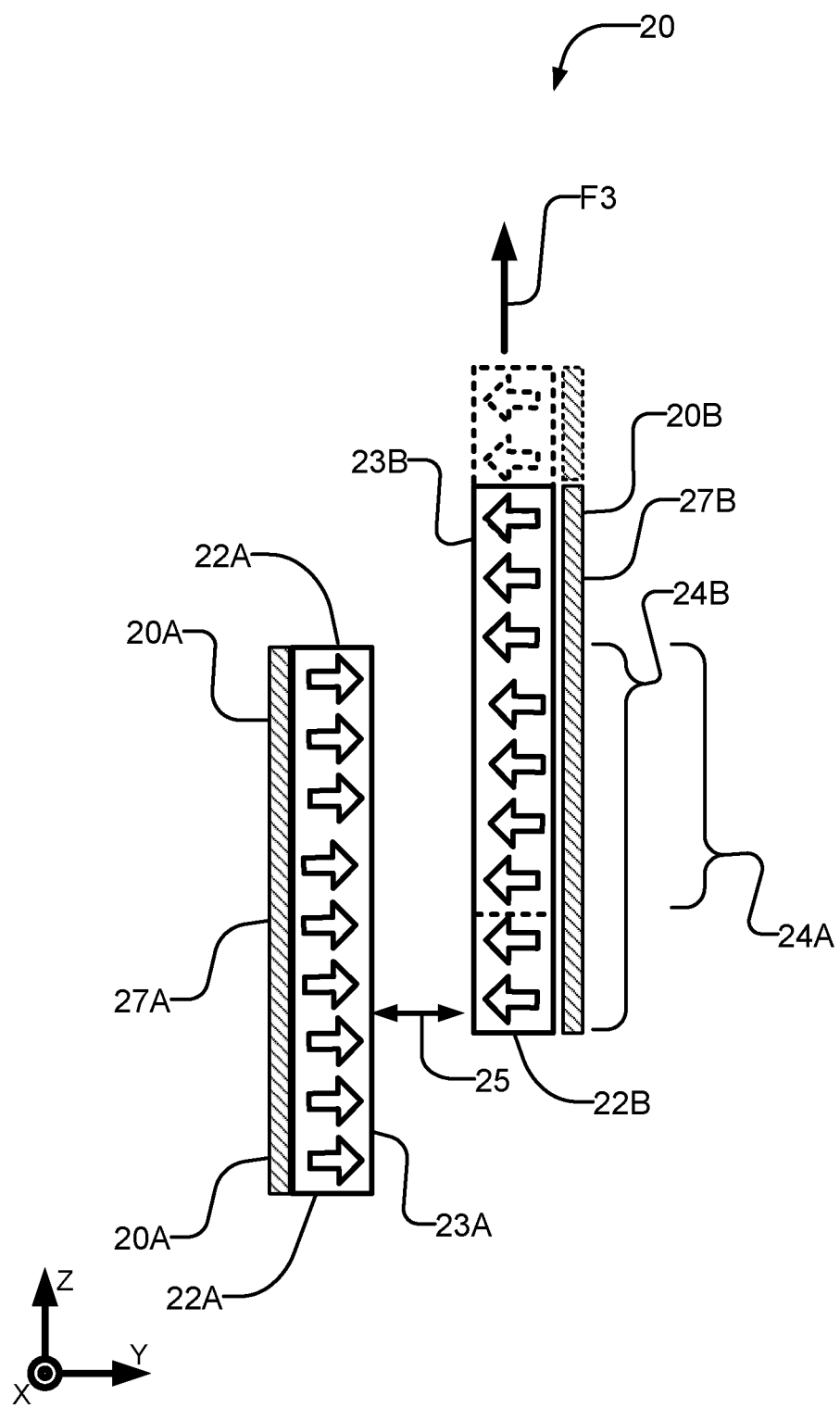
Figure 1D:
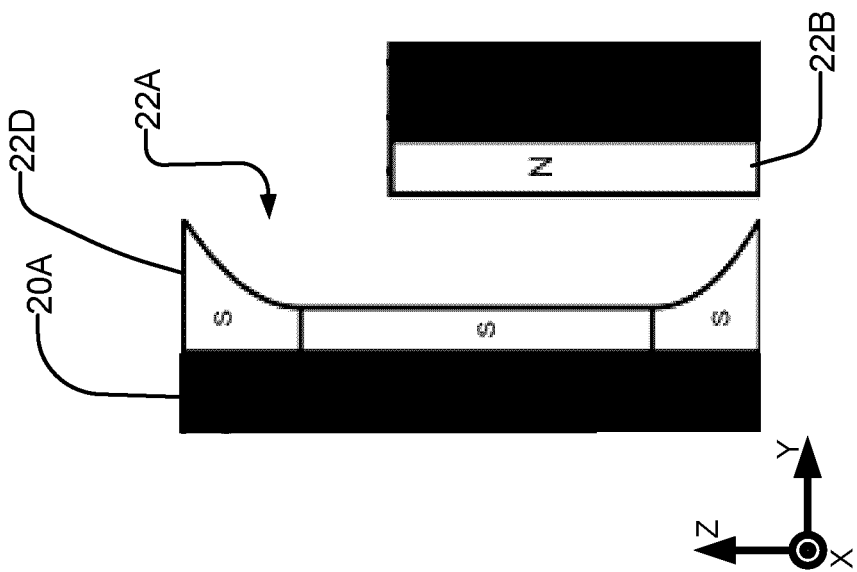
Figure 1C:
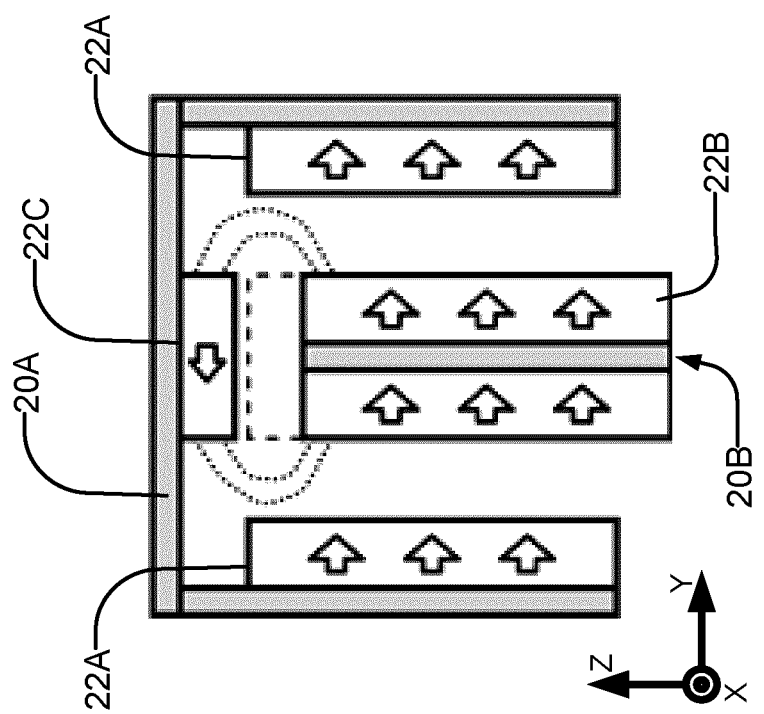

In some embodiments, stator 20A comprises one or more supplementary magnets 22C and/or pieces of magnetic material which are attracted to (or repelled by) magnets 22B of translator 20B as translator 20B approaches the point where stator 20A and translator 20B fully overlap and/or the point where stator 20A and translator 20B fully separate (see e.g. FIG. 1C). Supplementary magnet 22C may be dimensioned, positioned and have magnetic properties chosen to exert an attractive (or repulsive) force on translator 20B that varies with the position of translator 22B in a way that counteracts changes in the force applied by mechanism 20 as translator 20B approaches the point where stator 20A and translator 20B fully overlap and/or the point where stator 20A and translator 20B fully separate. This is one approach to increase the designated range of travel of translator 20B relative to stator 20A over which mechanism 20 provides substantially constant force. Another approach is to make translator 20B and stator 20A longer in the direction of travel.

FIG. 1D depicts another example way of increasing the designated range of travel of translator 20B relative to stator 20A over which mechanism 20 delivers substantially constant force. In the FIG. 1D example, stator 20A comprises one or more flared magnets 22D located near the ends of stator magnets 22A. In some embodiments, one or both of stator 20A and translator 20B includes flared magnets 20D.

The gap (i.e. displacement in the y-direction) between flared magnets 22D and translator magnets 22B is smaller than the gap between stator magnets 22A and translator magnets 22B between flared magnets 22D. The size of the gap between flared magnets 22D and translator magnets 22B can be set to maintain the uniformity of the shear force as translator 20B approaches closer to the point where stator 20A and translator 20B fully overlap and/or the point where stator 20A and translator 20B fully separate.

Magnets 22A and 22B may comprise any suitable permanent magnets. For example, magnets 22A and 22B may each comprise one or more rare earth magnets. Magnets 22A and/or 22B may each be provided by a single magnet or by a row of two or more smaller magnets arranged end to end and having poles aligned to provide pole 23A or 23B as the case may be. In some embodiments magnets 22A and/or 22B are provided by Neodymium-Iron-Boron magnets. Other magnetic materials (e.g. alnico, ceramic (ferrite), and/or samarium cobalt) may be used to provide some or all of the magnets.

In one or both of stator 20A and translator 20B the corresponding magnet 22A or 22B may be mounted to a support plate 27A or 27B. Plates 27A, 27B may be made of ferromagnetic material (e.g. iron or magnetic steel). Plates 27A, 27B may advantageously be made from nickel-plated low-carbon steel. Plates 27A, 27B may support magnets 22A, 22B respectively and also serve to hold magnets 22A and 22B in desired relative alignment.

Magnets 22A and/or 22B may be attached to plates 27A, 27B in any suitable manner including by suitable adhesives, fasteners, clamps or the like. In some embodiments plates 27A and/or 27B are shaped (e.g. by machining) to provide pockets and/or projections which receive and locate magnets 22A and/or 22B. In some embodiments magnets are provided by magnetic sheets that have embedded polarization patterns.

Since opposite magnetic poles attract, stator 20A is pulled toward translator 20B by a significant force. Stator 20A and translator 20B are mounted to resist this force.

Mechanism 20 may be varied by making the polarities of poles 23A and 23B the same (e.g. both N poles or both S poles). This changes the direction of the force generated by apparatus 20 relative to the arrangement shown in FIG. 1A. If poles 23A and 23B are of the same polarity then the force generated by apparatus 20 would urge translator 20B to move in a direction such that the overlap of pole 23B with pole 23A is reduced. The relative positions of stator 20A and translator 20B can be adjusted accordingly to allow apparatus 20 to generate a force in direction F3 (e.g. see FIG. 1B).

Stator 20A and translator 20B are not limited to having a single row of magnets. Either or both of stator 20A and translator 20B may comprise plural rows of magnets. Providing more rows of interacting magnets is one way to increase the magnitude of forces that mechanism 20 is capable of generating.

In some embodiments, stator 20A and translator 20B each include plural rows of magnets having a first polarity interdigitated with plural rows of magnets having a second polarity. The stator and translator may be moved relative to one another in a direction transverse to the rows of magnets to adjust the magnitude of force produced by the mechanism. An illustrative example of this is apparatus 30 shown in FIG. 2. Apparatus 30 may include any features and/or details of construction described herein in relation to apparatus 20.

In apparatus 30, a stator provides at least one ferromagnetic surface, oriented parallel to the direction of motion and an x axis. The magnetic surface includes pairs of magnets arranged along the surface to create a magnetic field. The magnets have a uniform polarity in the direction of motion, but alternate in polarity when traversing the surface in a direction perpendicular to the axis of motion (e.g. an x axis direction). A translator similarly provides at least one ferromagnetic surface. Ferromagnetic surfaces of the stator and translator oppose one another across a gap.

Figure 2:
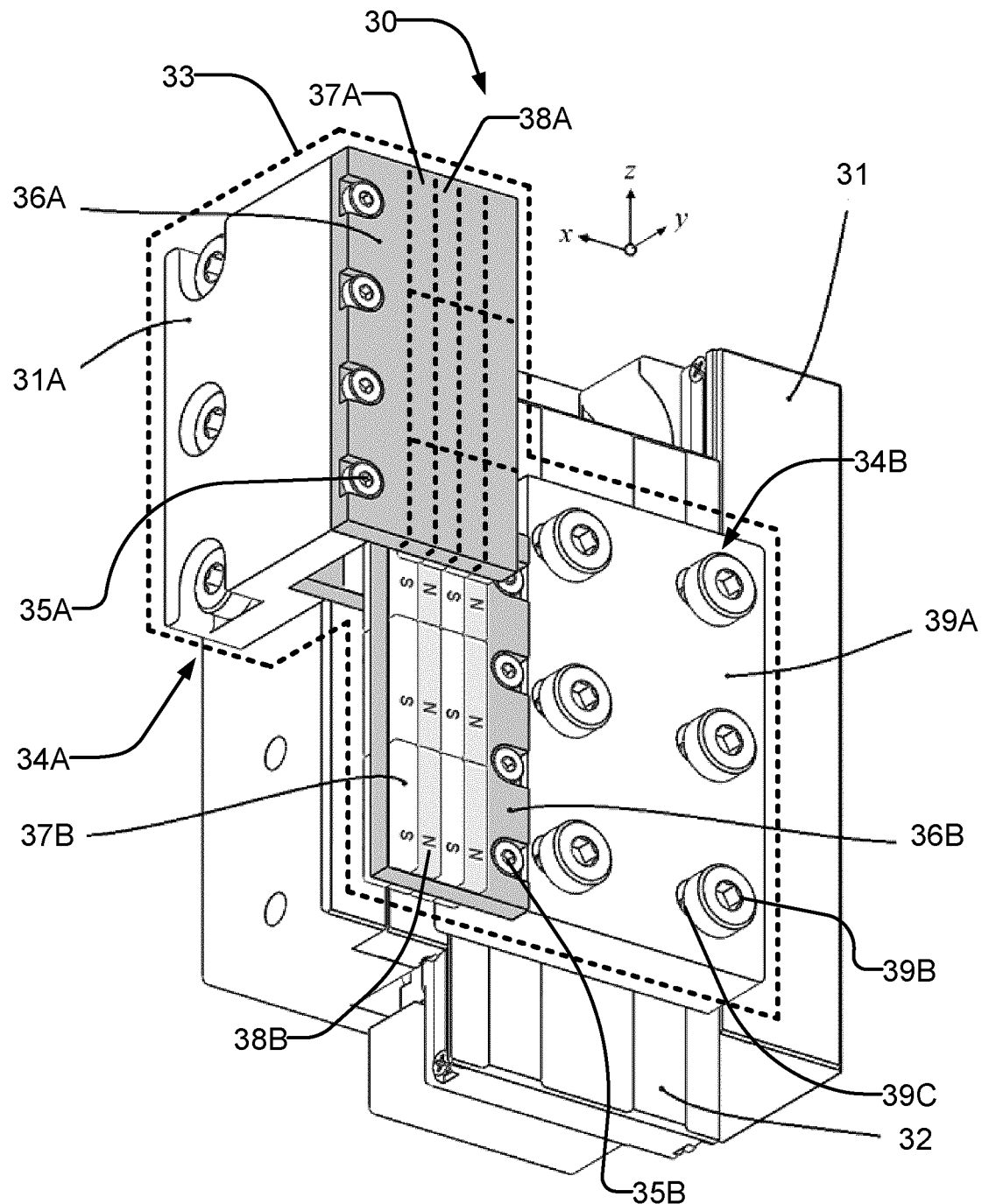
FIG. 2 is a perspective view of an exemplary magnetic counterbalance which forms part of the linear motion system shown in FIG. 1
Figure 2C:
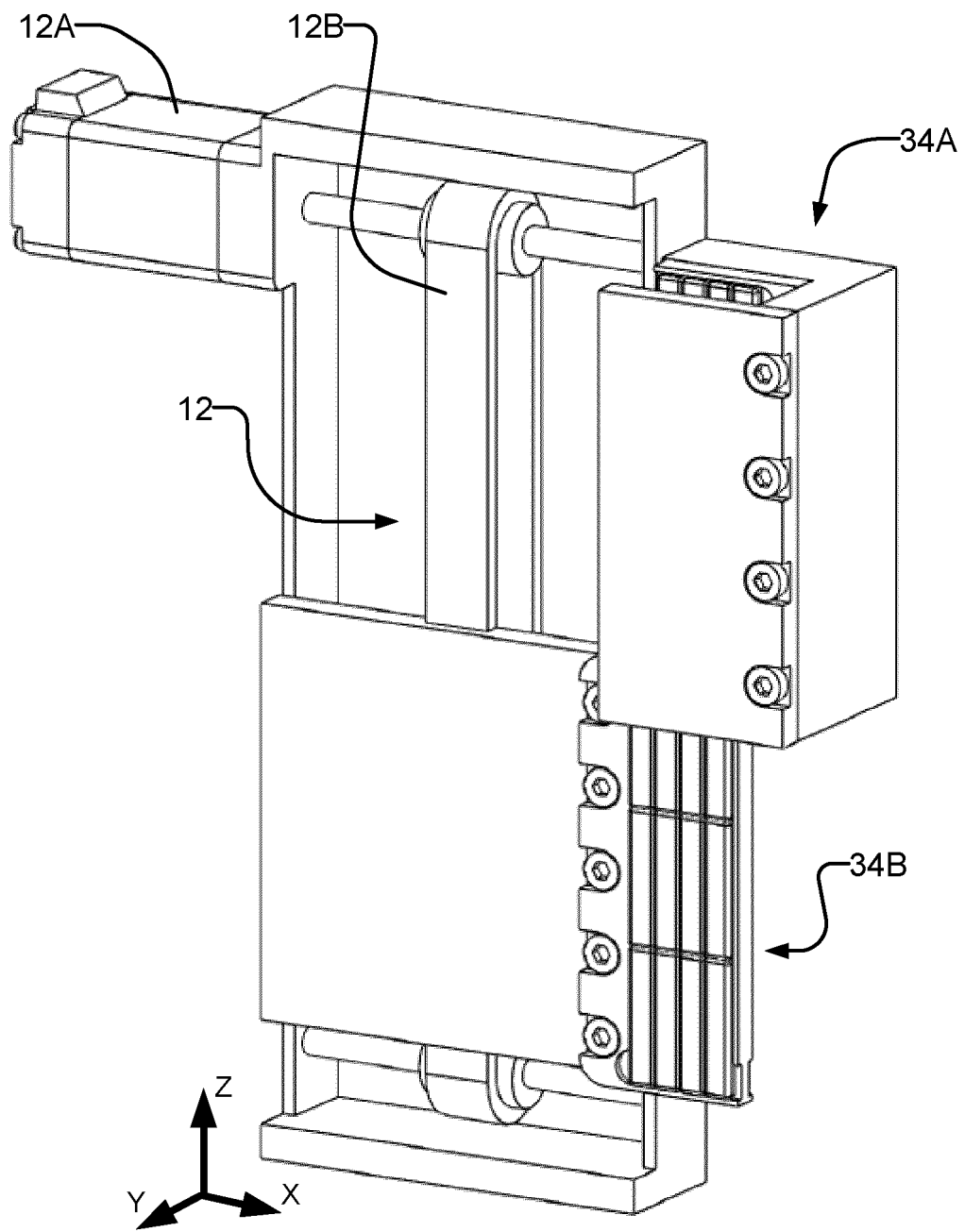
FIGS. 2C-2D are perspective views of exemplary linear motion systems comprising counterbalances like the counterbalance shown in FIG. 2.
Figure 2D:
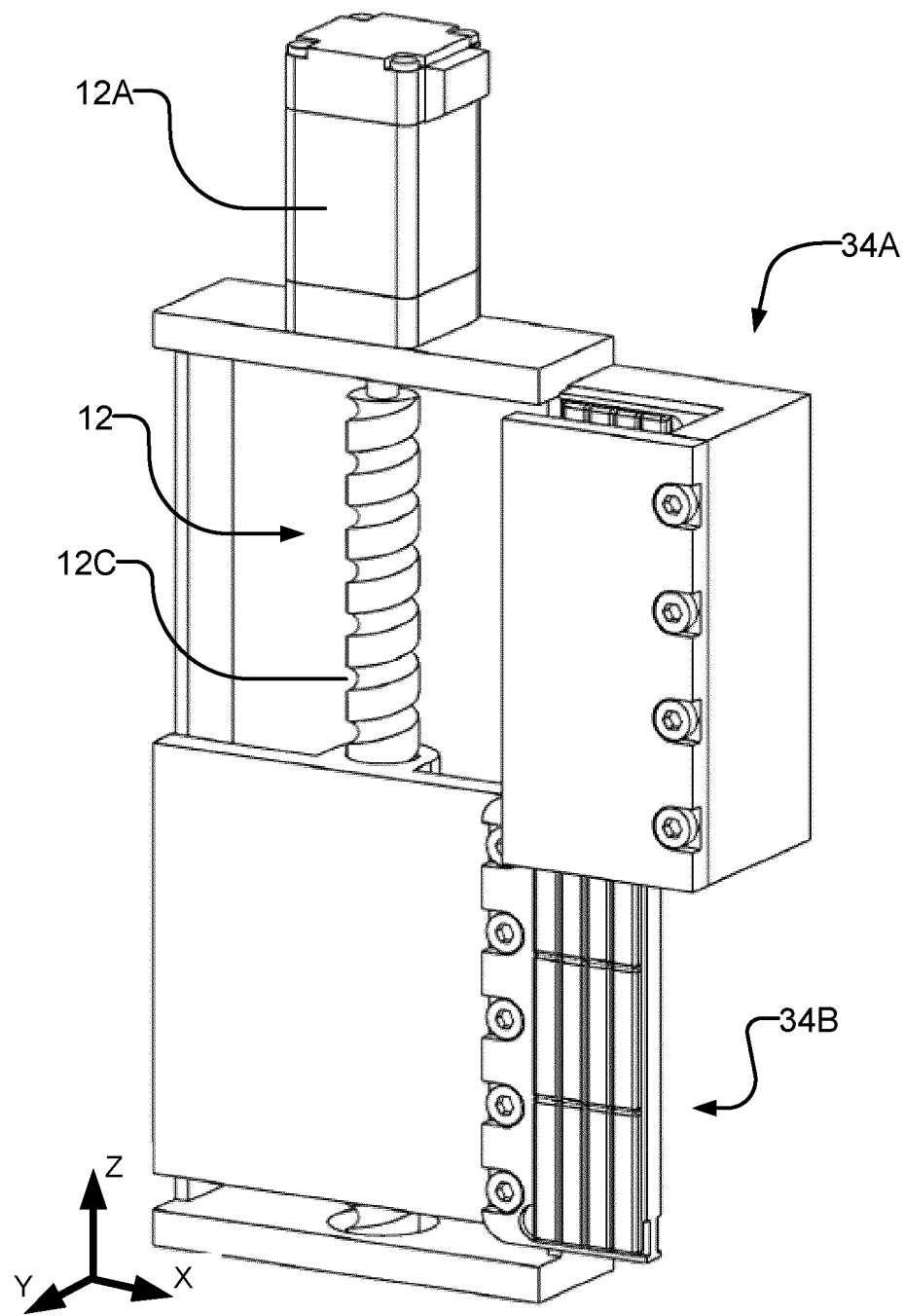

FIG. 2 shows apparatus 30 which includes a linear stage base 31. The direction of motion is indicated by the z axis, and in this example, gravity is considered to act in the negative z direction. A linear stage platform 32 is movable in the z axis direction relative to stage base 31. Apparatus 30 includes a counterbalance 33 arranged to apply a force directed in the positive z direction to platform 32. Counterbalance 33 includes a stator 34A and a translator 34B.

Stator 34A is attached to stage base 31 by a connecting piece 31A and fasteners 35A. Connecting piece 31 is preferably non-magnetic. Stator 34A comprises a ferromagnetic surface 36A. First rows 37A of magnets extend parallel to the z axis. The magnets of first rows 37A are oriented to present poles of a first polarity (N) to translator 34B and are mounted to surface 36A. FIG. 2A shows second rows of magnets 38A are oriented to present poles of a second polarity (S) to translator 34B and are mounted to surface 36A interdigitated with the rows of first magnets 37A.

Translator 34B comprises a ferromagnetic surface 36B. First rows of magnets 37B that extend parallel to the z axis are oriented to present poles of the second polarity (S) to stator 34A and are mounted to surface 36B. Second rows of magnets 38B are oriented to present poles of the first polarity (N) to stator 34A and are mounted to surface 36B interdigitated with the rows of first magnets 37B. Ferromagnetic surface 36B is mounted to platform 32 by fasteners 35B. Ferromagnetic surfaces 36A and 36B may be effective to concentrate the magnetic fields of magnets 37A and 37B respectively on the sides of magnets 37A, 37B that face away from ferromagnetic surfaces 36A, 36B.

Rows 37A are equally spaced apart by a pitch distance. Rows 37B are spaced apart by a pitch distance that is equal to the pitch distance of rows 37A. The pitch distance may, for example be in the range of a few mm to about 25 mm although other values for the pitch distance may be used in some applications. In some embodiments the pitch distance is in the range of 3 mm to 10 mm.

Rows 38A and rows 38B of translator 34B are preferably spaced apart by a pitch distance that is equal to the pitch distance of rows 37A and 37B of stator 34A although this is not mandatory.

In some embodiments, the pitch distance of rows 37A and/or 37B vary across the width of stator 34A. One way to construct an array of magnets that has a varying pitch distance is to use programmable magnets such as Polymagnets™ available from Correlated Magnetics Research LLC or the like for magnets. In such embodiments, the varying pitch can act to control the relationship between applied force and transverse displacement of translator 34B relative to stator 34A.

The number of rows 37A, 37B, 38A, 38B may be selected for a given application. For example, in some applications the number of each of rows 37A, 37B, 38A, 38B is in the range of 2 to 10.

In the FIG. 2 example, surfaces 36A and 36B are generally flat so that magnets 37A and 38A form a first planar array and magnets 37B and 38B form a second planar array that faces the first planar array. Each of the first and second planar arrays is an example of a magnetic multipole surface. Poles of magnets in the first planar array are spaced apart from poles of adjacent magnets in the second planar array by a gap 25.

The center to center spacing (i.e. "pitch") of rows 37A in an x direction that extends perpendicular to the z axis and parallel to the first and second planar arrays is preferably the same as the center to center spacing of rows 37B in the x direction.

The magnitude of the force generated by counterbalance 33 may be adjusted by moving stator 34A and translator 34B relative to one another to:
vary the alignment of magnet rows 37A with magnet rows 37B (e.g. by displacing stator 34A and/or translator 34B in the x direction); and/or
vary the width of gap 25 (e.g. by moving stator 34A and/or translator 34B in a y direction perpendicular to both of the x and z directions.

Transverse adjustment effective to alter the alignment of magnet rows 37A with magnet rows 37B may be achieved by any suitable mechanism. In apparatus 30, translator 34B is attached to platform 32 by a translator mount 39A which is held in place by fasteners 39B which extend through slots 39C. Translator 34B is movable in the x direction by loosening fasteners 39B, sliding translator mount in the x direction and then tightening fasteners 39B. Any of a wide range of other mechanisms may be provided to allow translator 34B to be shifted relative to stator 34A in the x direction. For example, translator 34B and/or stator 34A may be: mounted on transversely oriented stages, held in place by clamps that can be released and reapplied to reposition translator 34B and/or stator 34A; positioned by screws which can be turned to change the x position of translator 34B and/or stator 34A; positioned by one or more cams that can be turned to set the x position of translator 34B and/or stator 34A; mounted by fasteners that can be selectively positioned to locate translator 34B and/or stator 34A at any of a selection of displacements in the x direction; etc.

Counterbalance 33 yields maximum force when magnet rows 37A are aligned with magnet rows 37B and magnet rows 38A are aligned with magnet rows 38B as illustrated in FIG. 3A. The magnitude of the force produced by counterbalance 33 can be reduced by shifting magnetic surfaces of translator 34B relative to corresponding magnetic surfaces of stator 34A so that magnetic poles in the alternating structure of magnetic poles, which were initially aligned with each other, are displaced transversely to the direction of rows 37A and 37B so that they no longer fully align.

For example, in FIG. 3A north poles of magnets in rows 37A of stator 34A are aligned with south poles of magnets in rows 37B of translator 34B and the south poles of magnets in rows 38A of stator 34A are aligned with north poles of magnets in rows 38B of translator 34B. By shifting the magnets to the configuration shown in FIG. 3B where the north poles of magnets in stator rows 37A are aligned somewhere between the north and south poles of rows 37B and 38B of translator 34B the force provided by counterbalance 33 can be reduced. The misalignment of rows 37A and 38A of stator 34A with corresponding rows 37B and 38B of translator 34B reduces the magnitude of the overall magnetic attraction between stator 34A and translator 34B. A large enough misalignment can even create a net magnetic repulsion between the stator and translator (so that the direction of the force generated by counterbalance 33 is reversed).

By changing stator 34A and translator 34B from the configuration of FIG. 3A to the configuration of FIG. 3B the magnetic shear force in the direction of travel is reduced as the pole alignment is shifted, and the shear force can even be flipped to the opposite direction. In this way, by providing means to shift the translator relative to the stator in a controlled way, the actuation force of the constant force actuator can be conveniently and finely tuned, in a continuous fashion. This facilitates precisely adjusting counterbalance 33 to apply a desired force (e.g. to balance a specific gravity load).

FIG. 3C illustrates an additional way to adjust the force produced by counterbalance 33 by varying gap 25.

Counterbalance 33 may be varied in a number of ways, for example:
the polarities of the magnets of stator 34A or translator 34B may be switched so that like poles of corresponding rows 37A and 37B face one another and like poles of corresponding rows 38A and 38B face one another (e.g. see FIGS. 3D-3F).
some or all of rows 38A and/or 38B may be omitted.
magnetic surfaces of the stator and translator are not necessarily flat, for example they may be curved or faceted in cross sections in planes perpendicular to the direction of travel.
a stator and/or a translator may include plural distinct magnetic surfaces.
two or more counterbalances 33 may be connected to apply force to an object.
etc.

In some embodiments a constant force mechanism has plural sets of interacting magnetic surfaces in which each set of magnetic surfaces operates to apply a force to an object as described above. Each of the magnetic surfaces may have any of the constructions as described herein.

Figures 4A, 4B:
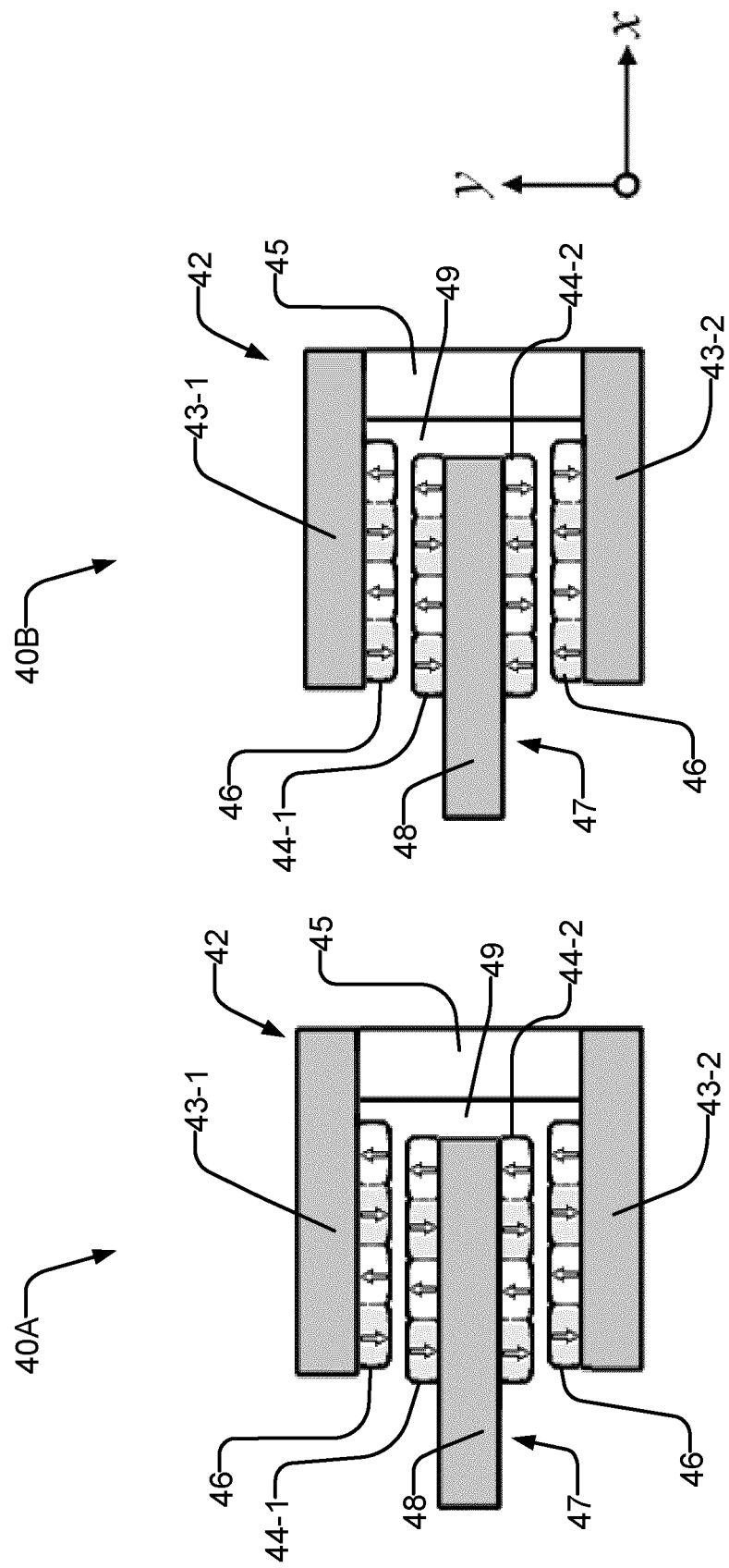
FIGS. 4A-4C depict exemplary attraction type configurations between a stator and a translator of a magnetic counterbalance.

For example, a stator or translator may comprise a pair of spaced apart magnetic surfaces mounted to face one another. A corresponding translator or stator may comprise a pair of magnetic surfaces mounted back to back that is received in the space between the pair of spaced apart magnetic surfaces. With this construction, two magnetic surfaces of the stator or translator interact magnetically with two respective corresponding magnetic surfaces of the translator or stator to generate forces. The pair of spaced apart magnetic surfaces may, for example be planar. The pair of magnetic surfaces may be parallel to one another. In some embodiments the magnetic surfaces of the pair of magnetic surfaces have identical constructions. FIGS. 4A and 4B illustrate constant force apparatuses 40A and 40B which have this general construction.

In one example favourable arrangement as shown in FIG. 4A, a stator (or alternatively a translator) 42 comprises two magnetic surfaces 43-1 and 43-2 separated by a nonmagnetic spacer 45. Stator 42 has the form of a channel that is C-shaped in cross section. Magnets 46 on the inside top and bottom surfaces of the C provide magnetic fields for magnetic surfaces 43-1 and 43-2.

In one favourable arrangement a corresponding translator (alternatively a stator) 47 has a backing 48 which supports magnetic surfaces 44-1 and 44-2 (in the illustrated example provided by magnets 46) on its opposing faces. Backing 48 is preferably ferromagnetic. Backing 48 may, for example, comprise a plate of a ferromagnetic material. Magnetic surfaces 44-1 and 44-2 of translator 47 are located generally inside the C-channel 49 of stator 42.

With the construction of FIG. 4A when magnets 46 are arranged so that magnetic surface 43-1 is attracted to magnetic surface 44-1 and magnetic surface 43-2 is attracted to magnetic surface 44-2, the available shear force (in the z direction) is doubled, while the normal force (in the y direction) is cancelled because the attraction between magnetic surfaces 43-1 and 44-1 results in a normal force which is equal and opposite to the normal force resulting from the attraction between magnetic surfaces 43-2 and 44-2.

When magnets 46 are arranged so magnetic surface 43-1 is attracted to magnetic surface 44-1 and magnetic surface 43-2 is attracted to magnetic surface 44-2 (i.e. the magnetic surfaces generally attract one another), the translator rests in an unstable equilibrium, as a small displacement from the centreline of the C-channel of the stator will increase the attraction force to one side and reduce the attraction force to the other side. Therefore, the translator must be supported to prevent the translator from being unstably drawn to one side or the other of the C channel. Such support may, for example, be provided by bearings or other supports which guide parts of a stage to which the stator and translator are respectively attached. However, the load on the bearings due to the magnets is significantly reduced compared with the arrangement in FIG. 3 due to cancellation of most of the normal force. The design may alternatively be arranged with the translator in a C-shape and the stator having two magnetic surfaces back-to-back.

In a design like that in FIGS. 4A and 4B different arrangements of magnets 46 may be used. For example, the polarizations of magnets 46 on surfaces 43-1 and 43-2 of stator 42 may be in the same direction and the polarizations of magnets 46 on surfaces 44-1 and 44-2 of translator 47 may be in the same direction as shown in FIG. 4A. Another option is for the polarizations of magnets 46 on surfaces 43-1 and 43-2 of stator 42 to be in opposite directions and the polarizations of magnets 46 on surfaces 44-1 and 44-2 of translator 47 to be in opposite directions as shown in FIG. 4B. The performance of both arrangements is similar, but when the magnets are in the same direction (FIG. 4A), ferromagnetic backing 48 may be made thinner or eliminated, although it is preferable to include backing 48 to provide structural support for magnets 46.

In embodiment like those shown in FIGS. 4A and 4B, holding the stator and translator relative to each other in a position where corresponding magnetic poles are misaligned (e.g. to set a magnitude of the force in the direction of motion generated by the apparatus to a desired level) causes a magnetic restoring force to be developed. The restoring force acts to realign the corresponding magnetic poles. The restoring force acts perpendicular to the direction of motion (i.e. in the x direction in FIGS. 4A and 4B) and is generally undesirable. The restoring force may be countered by bearings or other supports.

Figure 4C:
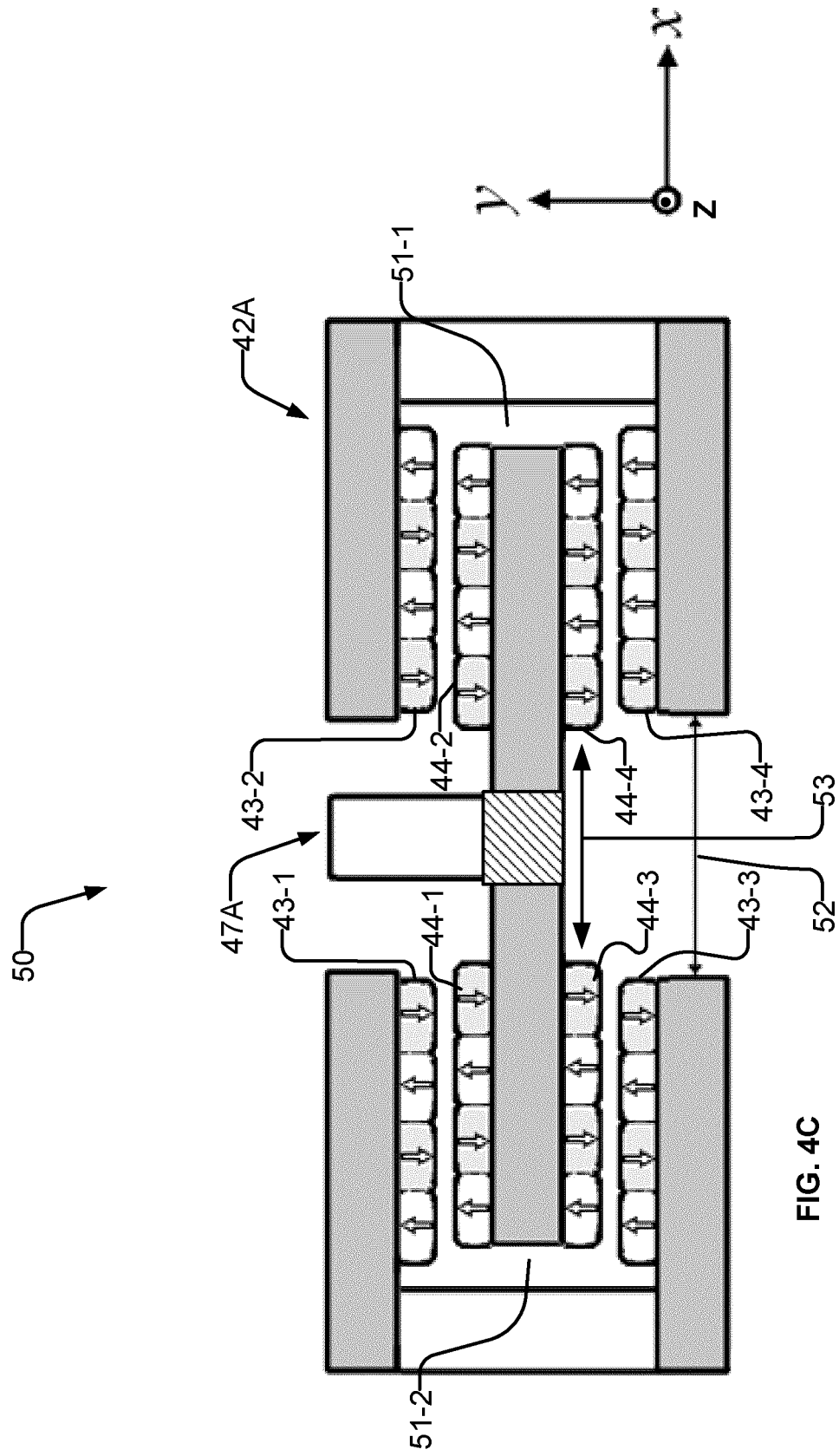

Apparatus according to the invention may be constructed such that restoring forces resulting from misalignment of magnetic poles in a stator with corresponding magnetic poles of a translator cancel out. This may be done by providing additional magnetic surfaces on the stator and translator. For example, in one favourable arrangement illustrated by apparatus 50 shown in FIG. 4C, a stator 42A comprises two C-shaped channels 51-1 and 51-2 which collectively provide four magnetic surfaces 43-1, 43-2, 43-3 and 43-4. Translator 47A is constructed to provide four magnetic surfaces 44-1, 44-2, 44-3 and 44-4 which respectively correspond to and are located adjacent to magnetic surfaces 43-1, 43-2, 43-3 and 43-4.

In apparatus 50 the magnitude of the force generated in the direction of motion (z direction) may be adjusted by moving C-channels 51-1 and 51-2 toward or away from each other as indicated by arrow 52 and/or by moving an assembly comprising magnetic surfaces 43-1 and 43-2 and an assembly comprising magnetic surfaces 43-3 and 43-4 toward or away from one another as indicated by arrow 53. These adjustments may be made symmetrically relative to translator 47A.

For example a bidirectional screw (shown schematically as 55) having a left-handed thread and a right-handed thread may be used to evenly adjust the distance between stator components or translator components. As another example, a wedge member or a scissors linkage may be used to evenly adjust the distance between stator components or translator components. As another example, individual stator and/or translator components may be supported by supports that include adjustment mechanisms (e.g. lead screws, fasteners in slots, wedges, fasteners that can be engaged in different apertures, etc.) such that plural translator and/or stator components may be manually repositioned in a symmetrical manner.

One or more locks, clamps, fasteners or the like may be used to fix the stator components in place after adjustment. The undesirable magnetic restoring force that is applied to realign the poles on one side of stator 42A will be balanced by a force in the opposite direction from the opposite side of stator 42A.

Figure 5B:
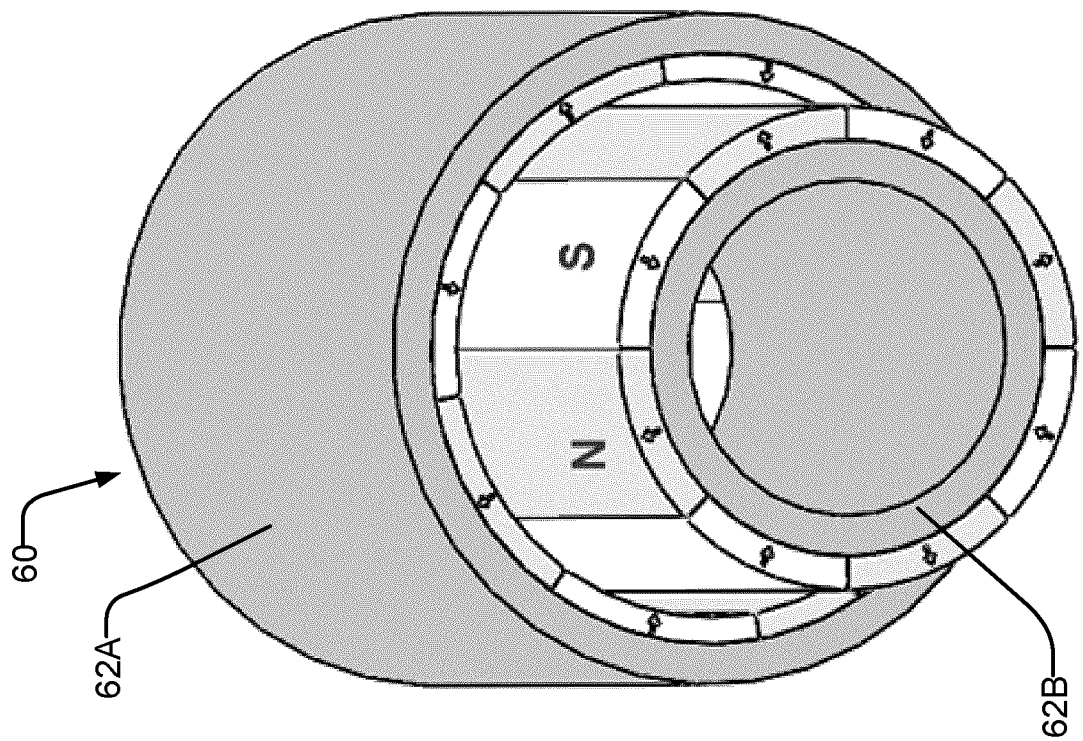
FIGS. 5A-5D depict cylindrical magnetic counterbalances according to example embodiments.
Figure 5A:
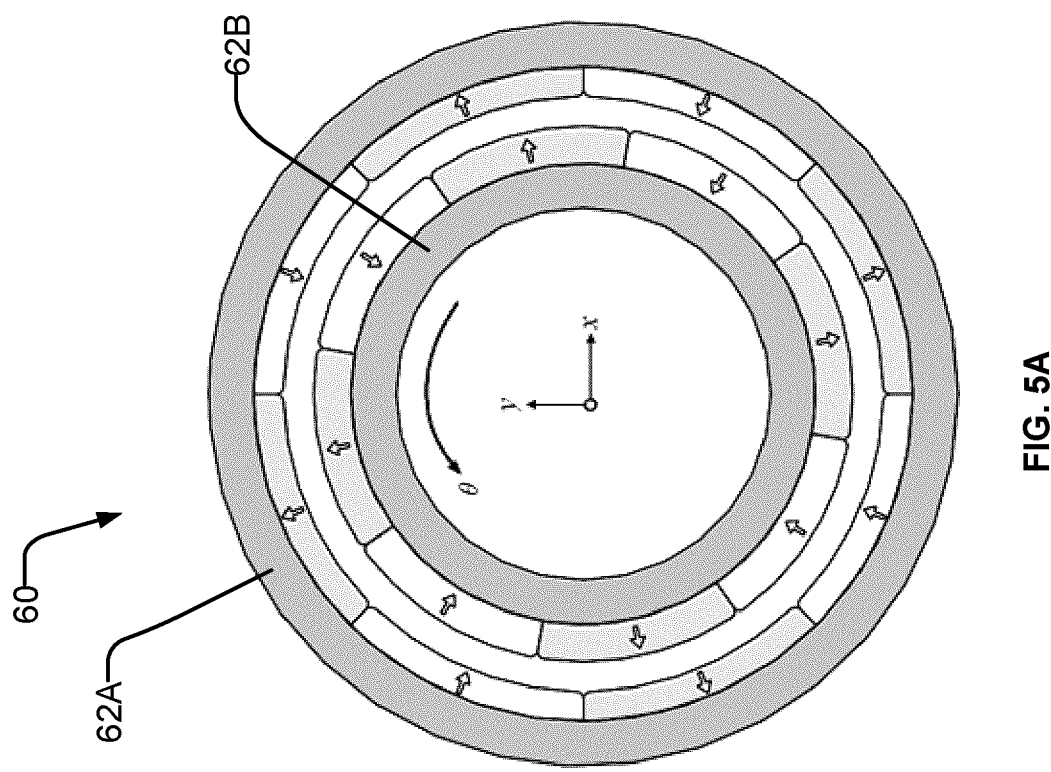

FIGS. 5A and 5B show an apparatus 60 for providing a constant force according to another example embodiment. In apparatus 60, a stator (or translator) 62A is tubular and receives a corresponding translator 62B (or stator) in a bore 63. In the illustrated embodiment stator 62A has a cylindrical inner surface which carries permanent magnets. Rotor 62B is provided by a hollow tube or solid cylinder with permanent magnets on its outer surface.

The magnets of stator 62A are arranged to provide elongated poles that extend axially along the surface 62A. In the illustrated embodiment, poles 63A polarized N alternate with poles 64A polarized S as one moves circumferentially around stator 62A.

Similarly, the magnets of translator 62B are arranged to provide elongated poles that extend axially along the outside of translator 62B. In the illustrated embodiment, poles 63B polarized S alternate with poles 64B polarized N as one moves circumferentially around translator 62A.

In operation, translator 62B moves axially into or out of the bore of stator 62A. A magnet-carrying portion of translator 62B projects into a magnet-carrying portion of stator 62A throughout an intended range of motion.

In apparatus 60, the force in the direction of motion can be adjusted by rotating stator 62A relative to translator 62B. Such rotation changes the circumferential alignment of the magnetic poles of translator 62B with corresponding magnetic poles of stator 62A. When the magnetic poles of translator 62B are not aligned radially with corresponding magnetic poles of stator 62A a restoring torque is developed in addition to the translation force.

Figure 5D:
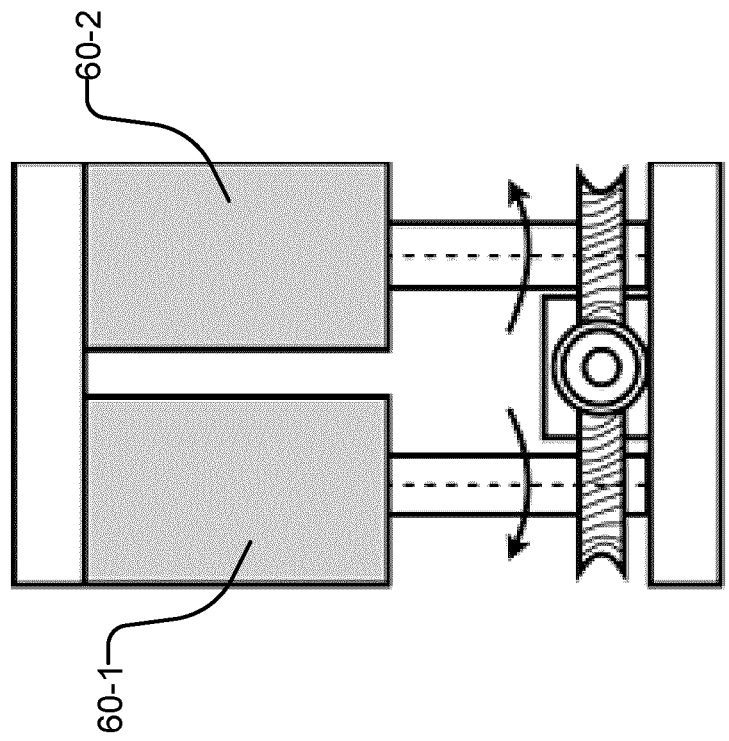
Figure 5C:
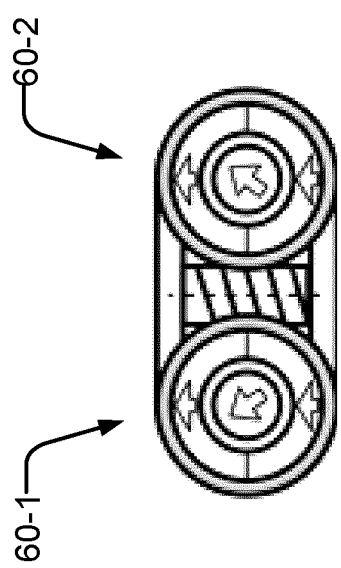

If it is undesirable to allow the restoring torque to be supported by the structure being moved (e.g. by bearings of a stage), a second cylindrical magnetic structure may be provided, and rotated in the opposite direction, providing a restoring torque in the opposite direction but a translation force in the same direction as the first (see FIGS. 5C and 5D). The two cylindrical structures may be mechanically linked, such as by gears (e.g. worm gears), so that the torque is transferred between the two structures and balanced so that no net torque is delivered to the bearing structure. In this case the two actuators may be located side-by-side relative to each other, displaced axially, or concentrically located with the outer diameter of one actuator inside the inner diameter of the other. It will also be noticed that with the cylindrical construction, the attraction type actuator is constructed identically to the repulsion type actuator, and one is transformed into the other by a relative rotation of one full magnet pitch.

FIGS. 5A and 5B shows apparatus 60 as including a multipole magnet constructed of 8 poles in each of stator 62A and translator 62B. Other numbers of poles may be used to achieve the same or similar results, including a dipole magnet or a quadrupole magnet. With the cylindrical design the parasitic forces are intrinsically balanced without additional complexity In some implementations, apparatus as described herein is constructed with a stator and translator that attract one another ("attraction type"). One way to apply such apparatus is to locate the stator above the translator in the direction of motion, so that the attraction force draws the translator into the stator, working to balance gravity.

Figure 6A:
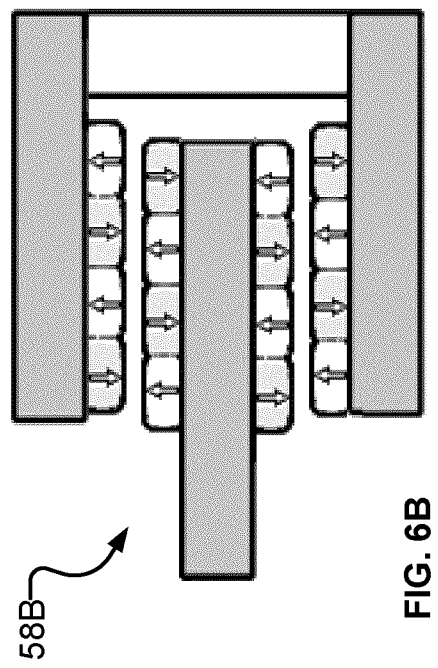
FIGS. 6A-6B depict exemplary repulsion type configurations between a stator and a translator of a magnetic counterbalance.
Figure 6B:
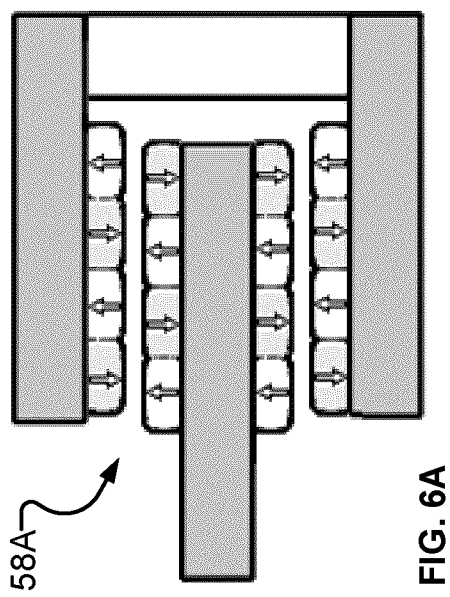

In other implementations the apparatus is constructed such that the stator and translator repel one another ("repulsion type"). One way to apply repulsion type apparatus is to locate the stator below the translator. The repulsion force of the magnets pushes the translator upward and away from the stator to balance the force of gravity. For example, FIGS. 6A and 6B respectively show apparatus 58A and 58B that are like apparatuses 40A and 40B shown in FIGS. 4A and 4B except that magnetic poles are arranged with north poles of stator magnets primarily facing north poles of translator magnets, and south poles of stator magnets primarily facing south poles of translator magnets. Just like a number of the attraction-type arrangements described above, the force generated by apparatus 58A or 58B may be adjusted by shifting the stator and translator relative to each other along an axis perpendicular to the motion and perpendicular to the magnet faces.

A benefit of a repulsion-type apparatus is that the translator is repelled by the stator and therefore does not experience an unstable attraction to the stator when displaced a small amount from the centreline. A disadvantage of a repulsion type apparatus is that the magnets, which are acting to oppose each other, experience an operating point of lower magnetic flux. As a result, there is an increased risk of demagnetization at elevated temperatures. Also, repulsion-type apparatus typically can generate less force relative to the force generated by an equivalent attraction-type apparatus of the same dimensions.

Figure 6D:
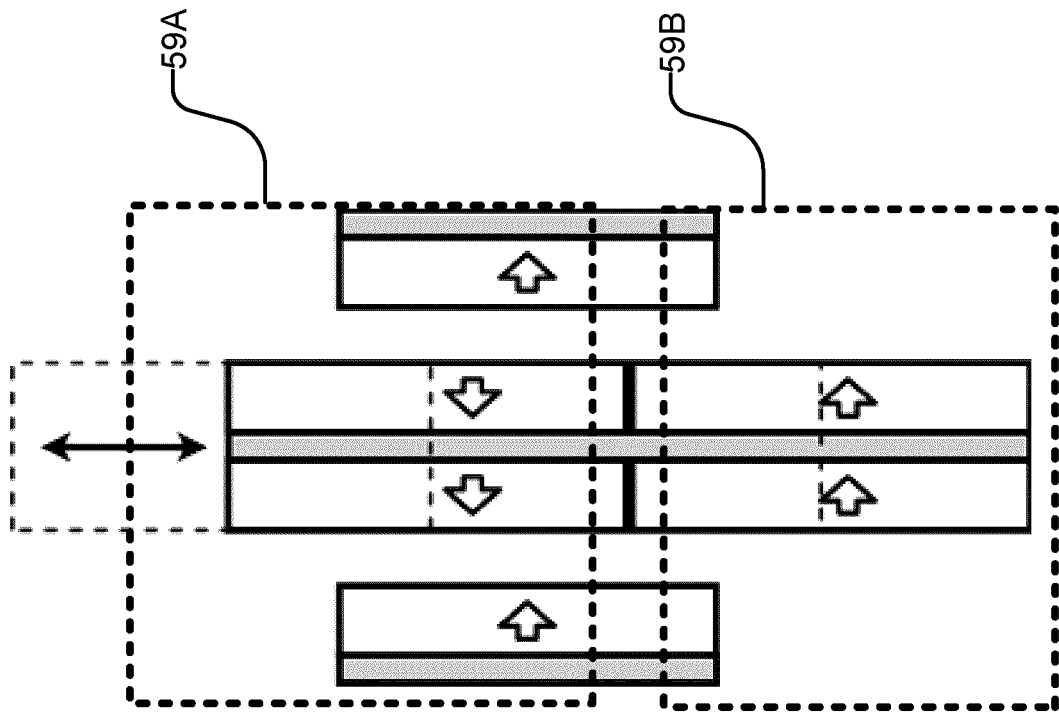
FIGS. 6C-6D depict exemplary mixed attraction and repulsion type configurations between a stator and a translator.
Figure 6C:
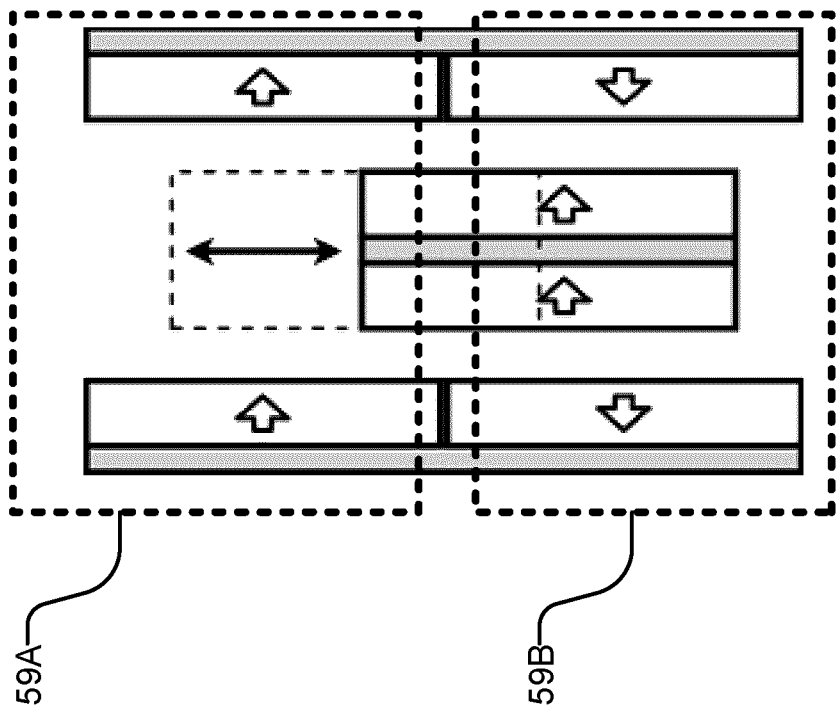

Repulsion and attraction type apparatus may be combined. An attraction type part 59A of the combined apparatus may apply a force by pulling an object while a repulsion type part 59B of the apparatus may add to the applied force by pushing on the object (e.g. see FIGS. 6C and 6D). This construction may be applied to provide a greater force from apparatus that fits within a relatively small envelope.

There are various ways in which multipole magnetic surfaces may be constructed in addition to those described above. These include:
- A magnetic surface may be provided by a single magnet with a multipolar polarization.
- Magnets may be arranged in a Halbach array which concentrates magnetic field on one side of the array. In a Halbach array, adjacent magnets have different directions of magnetization such that the direction of magnetization rotates (e.g. by 90 degrees) from one magnet to the next. The Halbach array may extend in a transverse direction and comprise magnetized rods that extend parallel to the direction of motion of the translator. Where a Halbach array is used to provide a magnetic surface a ferromagnetic backer may not be required.

In an ideal case, the magnetic flux density of the magnetic surfaces described herein along any line parallel to the direction of travel is constant. This is not always achievable where the magnetic field of the magnetic surface is provided by discrete magnets. This is because discrete magnets generally do not have a perfectly uniform magnetization across their pole surfaces. Instead, a discrete bar magnet tends to have the strongest magnetization toward the centre of the bar magnet. This non-uniform magnetization can result in variation in the developed force with position along the direction of travel (these variations are also known as "cogging"). Where magnetic surfaces are composed of regularly spaced small magnets, the cogging force variations repeat at the pitch of the magnets.

Figure 7:
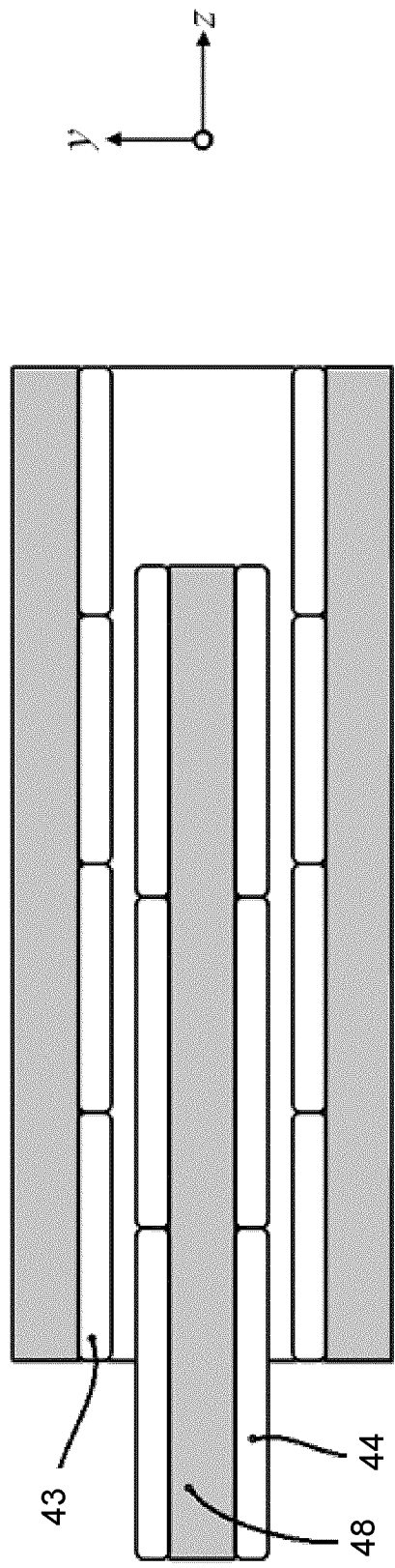
FIG. 7 depicts an exemplary configuration between a stator and a translator of a magnetic counterbalance where the dimensions of the magnets of the stator and the dimensions of magnets of the translator are different.

One way to reduce or eliminate cogging is to assemble the stator from bar magnets of a first length and to assemble the translator from bar magnets of a second length different from the first length. An example of this is shown in FIG. 7. In embodiments where the stator and the translator are substantially the same length in the direction of travel (e.g. a z direction as described elsewhere herein), keeping the number of magnets in the translator relatively prime to the number of magnets in the stator (i.e. one is the largest common divisor of the number of magnets in a row of the stator and the number of magnets in a corresponding row of the translator) can greatly reduce cogging force variations.

Another way to reduce or eliminate cogging is to stagger the magnets of either the stator or translator or both, so that not all of the magnet centres align at the same point in travel. Various examples of staggered magnets are shown in FIGS. 8A to 8E.

Figure 9B:
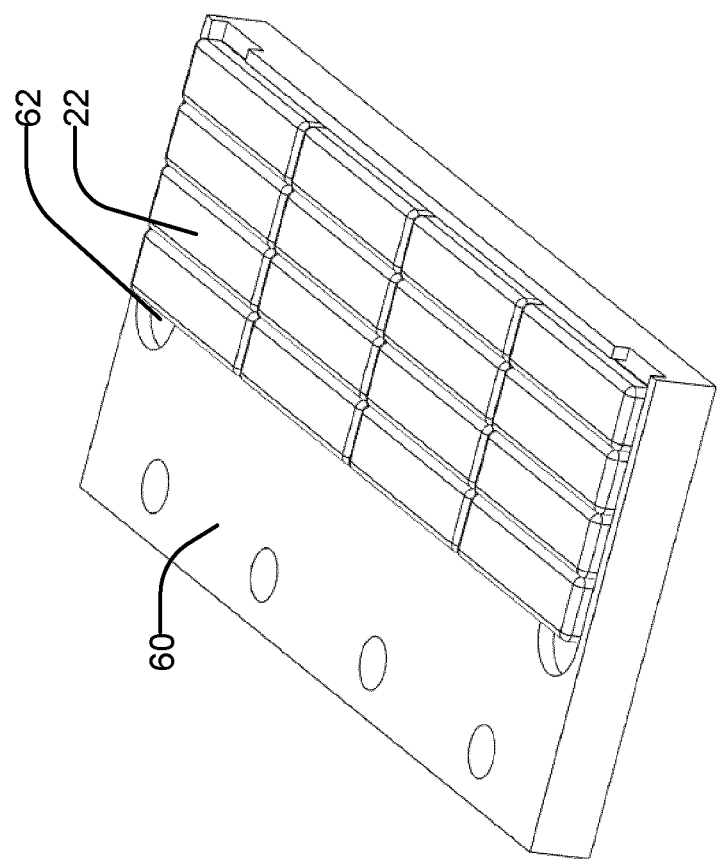
FIGS. 9A and 9B depict an example arrangement for fixating magnets in place.
Figure 9A:
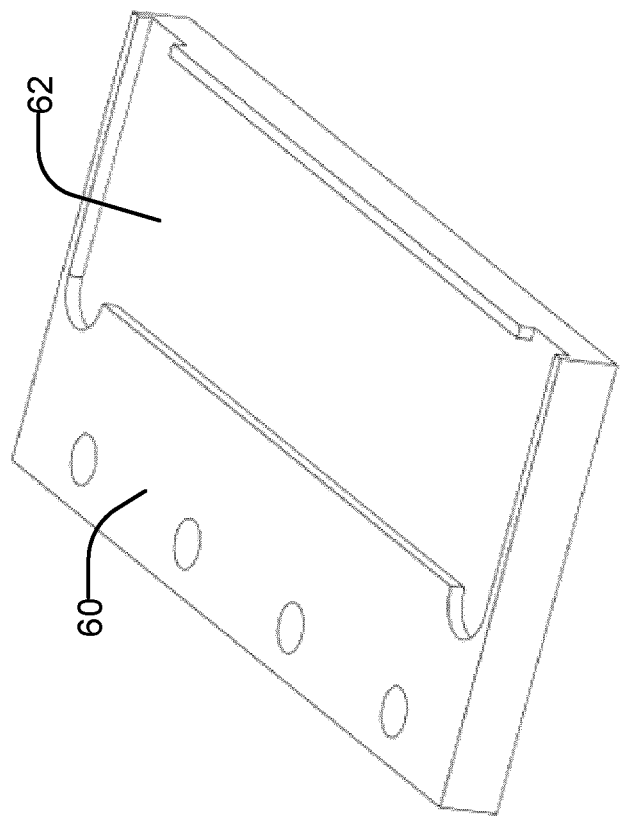

In operation, the magnets are subjected to large forces that may act to displace them from their intended locations on their respective surfaces. It may be necessary or desirable to adhesively bond, mechanically fasten, or otherwise fix the magnets in place. In some embodiments a backing plate, which may comprise a ferromagnetic backing plate is formed with recesses or pockets which receive the magnets. Engagement of the magnets in the recesses helps to prevent displacement of the magnets in directions parallel to the surface of the backing plate and also facilitates more secure fixation of the magnets to the backing plate. An example of this construction is shown in FIGS. 9A and 9B in which backing plate 60 comprises a recess or pocket 61 that receives an array of permanent magnets 22. Pocket 61 mechanically constrains displacement of individual magnets 22 to prevent movement parallel to plate 60. In cases where permanent magnets 22 are provided on both faces of plate 60, pockets 61 may be provided on both faces of plate 60.

FIGS. 10A, 10B and 10C are cross sectional views in planes that are transverse to a direction of motion that illustrate further example embodiments 100A, 100B and 100C respectively. These embodiments include one or more assemblies 121 that are rotatable about axes that extend parallel to the direction of motion. Each of assemblies 121 includes one or more magnets arranged to provide elongated magnetic poles that extend parallel to the axis of rotation and the direction of motion and have magnetic polarizations oriented at a right angle to the axis of rotation. For example each assembly may comprise a cylindrical bar of magnetic material magnetized in a direction transverse to a longitudinal axis of the bar or a cylindrical bar in which one or more magnets are embedded.

Assemblies 121 are spaced apart from corresponding magnets 122 by gaps 123.

A magnitude of the force generated by apparatuses 100A, 100B and 100C in the direction of motion may be adjusted by rotating assemblies 121. In some embodiments assemblies 121 are rotatable through a range of rotation sufficient to cause a direction of the force applied in the direction of motion to be reversed. For example, rotation of one of the assemblies by 180 degrees will reverse the magnetic polarity presented by an assembly 121 to a pole of an adjacent magnet 122.

Rotation of plural assemblies 121 may be coupled, e,g, by a gear train, chain drive or the like. The coupling may constrain different assemblies 121 to rotate in a way that minimizes net forces in a direction transverse to the direction of motion, for example by causing adjacent ones of assemblies 121 to rotate in opposite directions as illustrated in FIG. 10A or by causing two symmetrically disposed groups of assemblies 121 to rotate in opposite directions as illustrated in FIG. 10B.

Figure 11A:
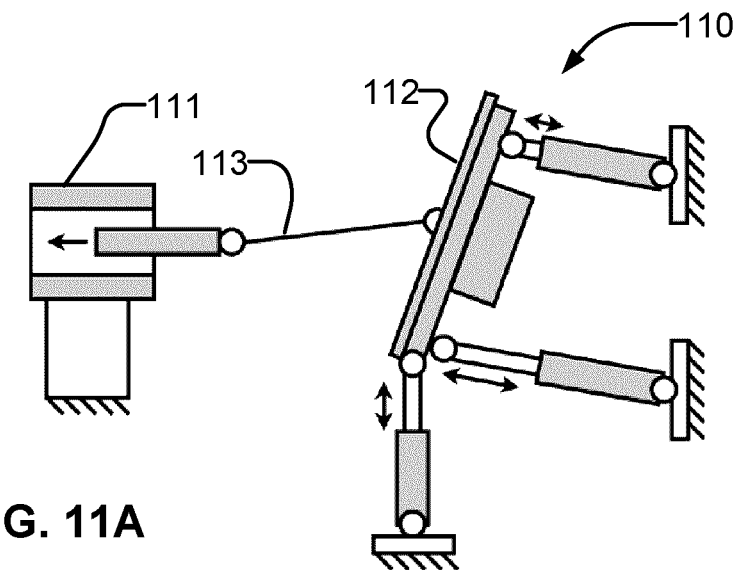
FIGS. 11A, 11B and 11C are schematic drawings which illustrate the application of force to an object by way of linkages.

Although specific reference may have been made above to the use of embodiments of the invention in the context of balancing gravity loads, it will be appreciated that the invention may be used as an adjustable constant-force actuator in other applications by applying forces over a distance, for example for balancing horizontal thrust loads, or as a preloading mechanism within an instrument, or as a substitute for a spring, such as an energy storage and release mechanism. For example, FIG. 11A shows a system 110 in which a constant force apparatus 111 which may have any of the constructions described herein or variations of such constructions applies a force to an object 112 by way of a linkage 113.

Furthermore, although specific reference may have been made in reference to the design of the device allowing adjustment of the force, the device may be used as intended without means for the adjustment being made available to the end user, such as with the adjustment surfaces securely fastened so that no further force adjustment is possible outside of the factory.

The descriptions above are intended to be illustrative, not limiting. Thus, it will be apparent to one skilled in the art that modifications may be made to the invention as described without departing from the scope of the claims set out below.

It is emphasized that the invention relates to all combinations of the above features, even if these are recited in different claims.

From the above description it will be appreciated that any of the embodiments described herein may be modified to provide other embodiments in ways that include:

- any embodiment where a magnetic surface of a stator attracts a corresponding magnetic surface of a translator may be modified (e.g. by switching magnetic polarities of the stator magnetic surface or the translator magnetic surface) so that the magnetic surface of the stator repels the corresponding magnetic surface of the translator.
- any embodiment where a magnetic surface of a stator repels a corresponding magnetic surface of a translator may be modified (e.g. by switching magnetic polarities of the stator magnetic surface or the translator magnetic surface) so that the magnetic surface of the stator attracts the corresponding magnetic surface of the translator.
- in any described embodiment a structure described as a translator may be used as a stator and a structure described as a translator may be used as a stator.
- in any embodiment the polarities of all magnets may be switched (by replacing N with S and vice versa).
- in any embodiment the adjustment of the counterbalance force can be automated. For example, apparatus as described herein may comprise a solenoid or the like coupled to temporarily urge the stator and/or the translator (e.g. against a strong spring) sideways (i.e. in a transverse direction) by a small fixed distance to increase or reduce the forced applied by the counterbalance. As another example, an actuator (which may be electrically, pneumatically or hydraulically powered, for example may be connected to move the stator and translator transversely relative to one another actively adjust the magnitude of force delivered by the apparatus. In many applications the added complication of providing a controlled actuator to adjust the force is not warranted.
- in any embodiment the stator and the rotor may be equal in length in the direction of motion.
- in any embodiment bearings may be provided by an integrated bearing structure comprising a rolling-element bearing or the like.

In some of the embodiments described herein a translator and a stator are respectively mounted to first and second parts of a stage that are movable relative to one another along a direction of motion. In such embodiments the stage may support an object being moved and also support the stator and translator in a desired spatial relationship. The stage may resist force components directed in directions other than the direction of motion (e.g. x and y directions). A constant force apparatus may be provided as a standalone device constructed to allow the stator and translator to move in a direction of motion relative to one another and to support the stator and translator relative to one another to resist force components that are oriented transverse to the direction of motion. For example, the constant force apparatus may comprise a stage that has a first part supported by suitable bearings to move freely relative to a second part in the direction of motion. The stator may be supported by the first part and the translator may be supported by the second part. The bearings may resist force components between the stator and translator that are directed transversely to the direction of motion.

Figure 11B:
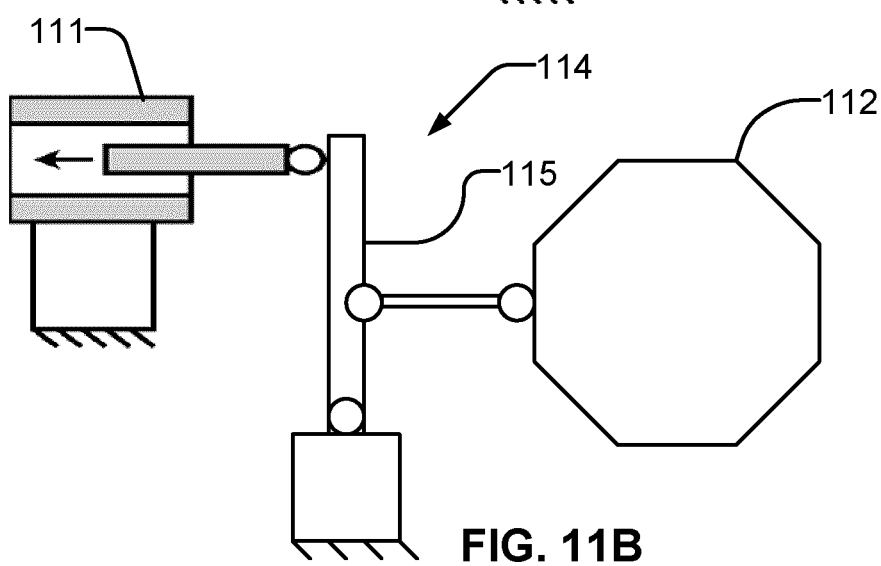
Figure 11C:
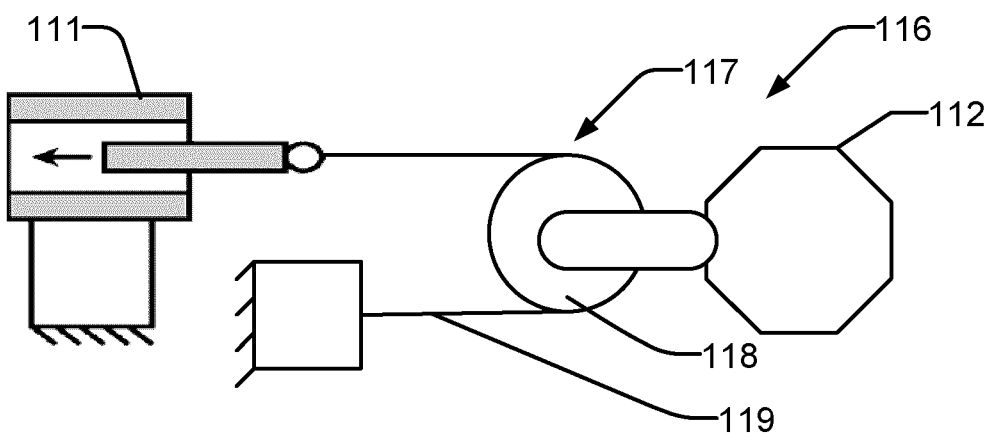

In such embodiments the constant force apparatus may be coupled to apply force to an object by a suitable linkage. The linkage may, for example, comprise a rigid member such as a bar or rod and/or a flexible member such as a cable or chain (see e.g. FIG. 11A). In some embodiments, the linkage provides a mechanical advantage. For example, the linkage may multiply the force provided by the constant force mechanism such that the force applied to the object by way of the linkage is larger than the force applied by the constant force mechanism to the linkage. An example of this is illustrated in FIG. 11B which shows a system 114 in which a constant force apparatus 111 is connected to apply force to an object 112 by way of a linkage 114 which includes a lever 115. Another example of this is illustrated in FIG. 11C which shows a system 116 in which a constant force apparatus 111 is connected to apply force to an object 112 by way of a linkage 117 which includes a pulley 118 and a flexible element 119.

As another example, the linkage may be configured so that the force applied to the object by way of the linkage may be smaller than the force applied by the constant force mechanism to the linkage. In such embodiments the travel of the translator relative to the stator of the constant force mechanism may be smaller than the travel of the object, thereby allowing the constant force mechanism to be relatively compact.

Non limiting examples of linkages that provide force multiplication include pivoting levers, pulley systems such as block and tackle type linkages etc.

Apparatus according to embodiments as described herein may possess one or more of the following advantages:
- the applied force is precisely adjustable;
- the apparatus is passive and does not require power or other supply;
- the apparatus can operate in a vacuum or in a controlled atmosphere or other applications that preclude the use of air;
- the apparatus can reduce the load on a drive mechanism, reducing energy consumption and heat production, and allows the drive mechanism to use a smaller motor, while improving safety;
- the apparatus can be used at cryogenic temperatures;
- the apparatus can provide substantially constant force throughout a long range of travel;
- the apparatus can be constructed to provide little or no parasitic force;
- the apparatus can effectively even with a large airgap;
- the apparatus does not experience wear,
- the apparatus adds little inertia,
- the apparatus consumes no energy;
- the apparatus can be cost-effective;
- the apparatus can provide a high load capacity.

Interpretation of Terms

Unless the context clearly requires otherwise, throughout the description and the claims:
- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a component (e.g. a bearing, actuator, assembly, device, circuit, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments" and/or in "some implementations". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" or "some implementations" possess feature A and "some embodiments" or "some implementations" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. Apparatus for applying a force comprising:
   a first part and a second part, the first and second parts movable relative to one another in a direction of motion,
   the first and second parts each comprising one or more permanent magnets arranged to provide one or more magnetic poles that are elongated and oriented parallel to the direction of motion, wherein the polarization of magnetic fields provided by the permanent magnets is substantially uniform along each of the magnetic poles in the direction of motion;
   wherein the one or more magnetic poles of the first part and the one or more magnetic poles of the second part are arranged facing one another and spaced apart by a gap and for a range of travel along the direction of motion one end of each of the magnetic poles of the first part is located between opposing ends of a corresponding one of the one or more magnetic poles of the second part in the direction of motion and one end of each of the one or more magnetic poles of the second part is located between opposing ends of a corresponding one of the one or more magnetic poles of the first part in the direction of motion such that interaction of the magnetic fields of the permanent magnets of the first and second parts causes a force directed to force the first part toward or away from the second part in the direction of motion,
   wherein the one or more magnetic poles of the first part are movable relative to the one or more magnetic poles of the second part in a direction different from the direction of motion to vary a magnitude of the force.

2. The apparatus according to claim 1 wherein each of the first and second parts comprises a plurality of the magnetic poles extending parallel to one another and parallel to the direction of motion.

3. The apparatus according to claim 2 wherein on each of the first and second parts one or more of the magnetic poles is polarized north and one or more of the magnetic poles is polarized south.

4. The apparatus according to claim 3 wherein on each of the first and second parts the one or more north polarized magnetic poles are interleaved with the one or more south polarized magnetic poles.

5. The apparatus according to claim 2 wherein on each of the first and second parts the magnetic poles are regularly spaced in a direction transverse to the direction of motion by a pitch distance.

6. The apparatus according to claim 1 wherein the first part and/or the second part are adjustably mounted such that a width of the gap may be set.

7. The apparatus according to claim 1 wherein the first part is movable relative to the second part in a direction transverse to the direction of motion and transverse to the gap such that an alignment between the one or more magnetic poles of the first part and the one or more magnetic poles of the second part is adjustable.

8. The apparatus according to claim 1 wherein the direction of motion is parallel to a z axis, a y axis is directed across the gap and an x axis is orthogonal to the y and z axes.

9. The apparatus according to claim 8 wherein the apparatus comprises means for adjusting the relative position between the permanent magnets of the first part and the permanent magnets of the second part along the x-axis.

10. The apparatus according to claim 8 comprising means for adjusting the size of the gap.

11. The apparatus according to claim 1 wherein the one or more magnetic poles of the first part are coplanar and the one or more magnetic poles of the second part are coplanar.

12. The apparatus according to claim 1 wherein the first part comprises a generally C-shaped support defining first and second surfaces that face one another wherein some of the magnetic poles of the first part are arranged on the first surface, some of the magnetic poles of the first part are arranged on the second surface and the magnetic poles of the second part are arranged between the first and second surfaces.

13. The apparatus according to claim 1 wherein the magnetic poles of the first and second parts are arranged in a plurality of groups wherein in each of the groups interaction of magnetic fields of the magnetic poles of the first and second parts within the group cause a force in the direction of motion and a force in a direction transverse to the direction of motion wherein the forces in the direction of motion for the groups of magnetic poles are parallel and add and the forces in the direction transverse to the direction of motion for the groups are anti-parallel and at least partially cancel.

14. The apparatus according to claim 13 wherein in each of the plurality of groups the magnetic poles of the first part are supported by a generally C-shaped support, the magnetic poles of the second part are located between opposing surfaces of the C-shaped support and the C-shaped supports are oriented to face in opposing directions.

15. The apparatus according to claim 1 wherein a first plurality of the magnetic poles of the first part are circumferentially spaced apart around a bore having a longitudinal axis extending in the direction of motion and a second plurality of the magnetic poles of the second part are circumferentially spaced apart around a longitudinal centerline of the first bore and supported to project into the first bore.

16. The apparatus according to claim 15 wherein the first plurality of magnetic poles of the first part are provided by a number N which is four or more magnetic poles that are equally angularly spaced around the first bore and the second plurality of magnetic poles of the second part are provided by N magnetic poles that are equally angularly spaced apart around the first bore.

17. The apparatus according to claim 16 wherein the second plurality of magnetic poles of the second part are rotatable relative to the first plurality of magnets of the first part that about a rotation axis that is concentric with the first bore.

18. The apparatus according to claim 17 comprising an adjustment mechanism operable to rotate the second plurality of magnetic poles of the second part relative to the first plurality of magnets of the first part around the rotation axis.

19. The apparatus according to claim 18 wherein the adjustment mechanism comprises a worm gear set.

20. The apparatus according to claim 1 wherein the one or more magnetic poles of the first part comprises a plurality of magnetic poles and the plurality of magnetic poles abut one another to provide a contiguous magnetic surface.

21. The apparatus according to claim 1 wherein each of the one or more magnetic poles of the first part comprises a plurality of first magnets arranged side by side to extend along the direction of motion and each of the one or more magnetic poles of the second part comprises a plurality of second magnets arranged side by side to extend along the direction of motion wherein the first magnets and second magnets have different dimensions in the direction of motion.

22. The apparatus according to claim 12 wherein the plurality of first magnets is made up of a first number of magnets and the plurality of second magnets is made up of a second number of magnets and the first number and the second number are relatively prime.

23. The apparatus according to claim 1 wherein each of the one or more magnetic poles of the first part comprises a plurality of first magnets arranged side by side and each of the one or more magnetic poles of the second part comprises a plurality of second magnets arranged side by side wherein, when a boundary between two adjacent ones of the first magnets is aligned in the direction of motion with a boundary between two adjacent ones of the second magnets then no other boundary between adjacent ones of the first magnets is aligned in the direction of motion with any boundary between two adjacent ones of the second magnets.

24. The apparatus according to claim 1 wherein the permanent magnets of at least one of the first part and the second part are supported on a backing member.

25. The apparatus according to claim 24 wherein the backing member comprises a ferromagnetic material.

26. The apparatus according to claim 24 wherein the permanent magnets are received in one or more recesses formed in a face of the backing member.

27. The apparatus according to claim 23 wherein the backing comprises a metal plate.

28. The apparatus according to claim 23 wherein the backing comprises nickel plated steel.

29. The apparatus according to claim 1 wherein the permanent magnets of at least one of the first and second parts are configured as a Halbach array.

30. The apparatus according to claim 1 wherein a force applied in the direction of motion on the second part as a result of interaction of magnetic fields from the permanent magnets of the first and second parts is constant over a range of motion of the stage within ±10%.

31. The apparatus according to claim 1 wherein movement of the second part in the direction of motion causes an elevation of the second part to change and the polarities of the permanent magnets are selected such that interaction of magnetic fields of the magnets causes a net force on the second part in the direction of motion that at least partially compensates for a gravitational force acting on the second part.

32. The apparatus according to claim 31 wherein the first and second parts are arranged such that the direction of motion is substantially vertical.

33. The apparatus according to claim 31 wherein the net force on the second part is substantially equal to a gravitational force on the second part and an object supported by the second part.

34. The apparatus according to claim 1 wherein the first and second parts comprise first and second parts of a stage that are slidable relative to one another in the direction of motion.

35. The apparatus according to claim 34 wherein the stage comprises bearings arranged between the first and second parts.

36. The apparatus according to claim 34 wherein the stage comprises a motor driven linear actuator connected between the first and second parts and operable to move the second part relative to the first part along the direction of motion.

37. The apparatus according to claim 36 wherein the linear actuator comprises a ball screw.

38. The apparatus according to claim 36 wherein the linear actuator comprises a linear motor.

39. The apparatus according to claim 36 wherein the linear actuator comprises a mechanical transmission coupling a motor to move the second part relative to the first part and the mechanical transmission has a mechanical efficiency of at least 70%.

40. The apparatus according to claim 36 wherein a force applied in the direction of motion on the second part as a result of interaction of magnetic fields from the permanent magnets of the first and second parts exceeds a maximum sustainable force of the linear actuator.

41. The apparatus according to claim 34 wherein the second part is coupled to apply force to an object.

42. The apparatus according to claim 41 wherein the second part is coupled to the object by way of a linkage.

43. The apparatus according to claim 42 wherein the linkage is arranged to provide a mechanical advantage.

44. The apparatus according to claim 42 wherein the linkage comprises a lever.

45. The apparatus according to claim 42 wherein the linkage comprises a block and tackle.

46. A constant-force apparatus comprising:
a first part,
a second part movable in a direction of motion relative to the first part,
a first permanent magnet assembly carried by the first part and comprising a first array of permanent magnets arranged to form a multipolar magnet array comprising a plurality of magnetic poles, the magnetic poles extending in the direction of motion,
wherein the permanent magnets of the first array have polarizations directed in a first transverse direction transverse to the direction of motion, the polarization of the permanent magnets of the first array is substantially uniform along the direction of motion and the polarization of the permanent magnets of the first array alternates in orientation along the first transverse direction at regular intervals along a second transverse direction orthogonal to the direction of motion and the first transverse direction when the first array of permanent magnets is traversed in the second transverse direction,
a second permanent magnet assembly carried by the second part and comprising a second array of permanent magnets arranged to form a multipolar magnet array comprising magnetic poles extending in the direction of motion, wherein the permanent magnets of the second array have a polarization that is substantially aligned with the first transverse direction and a number of the magnetic poles in the first and second arrays are equal,
wherein the polarization of the permanent magnets of the second array is substantially uniform along the direction of motion and the polarization of the permanent magnets of the second array alternates in orientation along the first transverse direction at regular intervals along the second transverse direction when the second array of permanent magnets is traversed in the second transverse direction,
wherein the first part and the second part are constrained to move relative to each other in the direction of motion within a fixed range of travel and the magnetic poles of the first and second arrays extend in the direction of motion for a distance at least equal to the range of travel;
wherein the magnets of the first array are spaced apart from the magnets of the second array in the first transverse direction by a first gap having a width of 5 mm or less and the first array is supported relative to the second array located such that throughout the entire range of travel, at least a portion of the first array overlaps in the direction of motion with a corresponding portion of the second array.

47. The apparatus according to claim 46 wherein magnetic flux of the magnets of the first array is substantially concentrated on a side of the first array that is toward the second array.

48. The apparatus according to claim 46 wherein the first part and the second part are equal in length in the direction of motion.

49. The apparatus according to claim 46 wherein, the first part, the second part or both the first and second parts includes a ferromagnetic backing structure located behind the corresponding first or second array.

50. The apparatus according to claim 46 wherein the first magnet assembly is configured as a linear Halbach array.

51. The apparatus according to claim 46 wherein the second magnet assembly is configured as a linear Halbach array.

52. The apparatus according to claim 46, wherein the magnetic poles of the first part are alignable in the second transverse direction with corresponding ones of the magnetic poles of the second part and magnetic polarities of the corresponding magnetic poles are opposite such that the corresponding magnetic poles of the first and second parts experience a mutual attraction force which results in a shear force in the direction of motion.

53. The apparatus according to claim 46, wherein the magnetic poles of the first part are alignable in the second transverse direction with corresponding ones of the magnetic poles of the second part and magnetic polarities of the corresponding magnetic poles are the same such that the corresponding magnetic poles of the first and second parts experience a mutual repulsive force which results in a shear force in the direction of motion.

54. The apparatus according to claim 52, wherein the permanent magnets of the first part are movable relative to the second part in the second transverse direction and movement of the permanent magnets of the first part relative to the second part in the second transverse direction alters a magnitude of the shear force in the direction of motion.

55. The apparatus according to claim 54 comprising an adjustment mechanism operable to adjust the magnitude of the shear force by displacing the permanent magnets of the first part relative to the second part in the second transverse direction.

56. The apparatus according to claim 52 comprising an adjustment mechanism operable to adjust the magnitude of the shear force by displacing the permanent magnets of the first part relative to the second part in the first transverse direction.

57. The apparatus according to claim 46 further comprising:
a third permanent magnet assembly carried by the first part and comprising a third array of permanent magnets arranged to form a multipolar magnet array comprising a plurality of magnetic poles, the magnetic poles extending in the direction of motion, wherein the permanent magnets of the third array have polarizations directed in a first transverse direction transverse to the direction of motion, the polarization of the permanent magnets of the third array is substantially uniform along the direction of motion and the polarization of the permanent magnets of the third array alternates in orientation along the first transverse direction at regular intervals along a second transverse direction orthogonal to the direction of motion and the first transverse direction when the third array of permanent magnets is traversed in the second transverse direction, a fourth permanent magnet assembly carried by the second part and comprising a fourth array of permanent magnets arranged to form a multipolar magnet array comprising magnetic poles extending in the direction of motion, wherein the permanent magnets of the fourth array have a polarization that is substantially aligned with the first transverse direction and a number of the magnetic poles in the third and fourth arrays are equal, wherein the polarization of the permanent magnets of the fourth array is substantially uniform along the direction of motion and the polarization of the permanent magnets of the fourth array alternates in orientation along the first transverse direction at regular intervals along the second transverse direction when the second array of permanent magnets is traversed in the second transverse direction, wherein the first and third arrays are oriented so that a side of the first array on which magnetic flux from the permanent magnets of the first array is concentrated faces in a direction opposite to a side of the third array on which magnetic flux from the permanent magnets of the third array is concentrated, wherein the second and fourth arrays are oriented so that a side of the second array on which magnetic flux from the permanent magnets of the second array is concentrated faces in a direction opposite to a side of the fourth array on which magnetic flux from the permanent magnets of the fourth array is concentrated, wherein the magnets of the third array are spaced apart from the magnets of the fourth array in the first transverse direction by a second gap.

58. The apparatus of claim 57, wherein the second and fourth arrays are on opposing faces of a common ferromagnetic backing.

59. The apparatus according to claim 57 wherein the second and fourth arrays are provided by opposing faces of a single array of the permanent magnets.

60. The apparatus according to claim 57 wherein the first, second, third and fourth arrays constitute a first assembly and the apparatus further comprises a second assembly that is mirrored as compared to the first assembly and is made up of fifth, sixth, seventh and eighth arrays which are respectively constructed like the first, second, third and fourth arrays and are arranged relative to one another like the first, second third and fourth arrays wherein the apparatus comprises a coupling that rigidly couples the second and fourth arrays of the first assembly to the sixth and eighth arrays of the second assembly.

61. The apparatus according to claim 60 wherein the coupling is adjustable to allow adjustment of a spacing between the second and fourth arrays of the first assembly and the sixth and eighth arrays of the second assembly.

62. The apparatus according to claim 61 wherein the coupling comprises adjustment features that are operable to simultaneously translate the second and fourth arrays relative to the first and third arrays and the sixth and eighth arrays relative to the fifth and seventh arrays by equal distances and in opposite directions.

63. The apparatus according to claim 61 wherein the coupling comprises a bidirectional screw member having a left-handed thread and a right-handed thread respectively connected to translate the second and fourth arrays of the first assembly and the sixth and eighth arrays of the second assembly in opposite directions when the bidirectional screw member is rotated.

64. The apparatus according to claim 61 wherein the coupling comprises a wedge member comprising first and second angled faces wherein the first angled face locates the second and fourth arrays and the second angled face locates the sixth and eighth arrays such that advancing or retracting the wedge member adjusts relative a position of the second and fourth arrays relative to a position of the sixth and eighth arrays.

65. The apparatus according to claim 61 wherein the coupling comprises a scissor linkage.

66. The apparatus according to claim 60 comprising one or more locks, clamps or fasteners configured to fix positions of the second and fourth arrays relative to the first assembly in the second transverse direction and to fix positions of the sixth and eighth arrays relative to the second assembly in the second transverse direction.

67. Apparatus comprising first and second constant force apparatus each according to claim 46 connected to apply force to an object.

68. The apparatus according to claim 67 wherein in the first constant force apparatus the magnetic poles of the first part are alignable in the second transverse direction with corresponding ones of the magnetic poles of the second part and magnetic polarities of the corresponding magnetic poles are opposite such that the corresponding magnetic poles of the first and second parts experience a mutual attraction force and in the second constant force apparatus the magnetic poles of the first part are alignable in the second transverse direction with corresponding ones of the magnetic poles of the second part and magnetic polarities of the corresponding magnetic poles are the same such that the corresponding magnetic poles of the first and second parts experience a mutual repulsive force.

69. The apparatus according to claim 67 wherein the first and second constant force apparatuses are oriented along a common axis in the direction of motion and the first and second constant force apparatuses share a common movable member through which forces are transmitted to the object.

70. The apparatus according to claim 46 wherein each of the poles of the first permanent magnet assembly comprises plural similar magnets placed adjacent to one another in the direction of motion to form a continuous magnetic pole.

71. The apparatus according to claim 70 wherein each of the poles of the second permanent magnet assembly comprises plural similar magnets placed adjacent to one another in the direction of motion to form a continuous magnetic pole.

72. The apparatus according to claim 71 wherein the similar magnets in the first magnet assembly have a length that is different from a length of the similar magnets in the second magnet assembly.

73. The apparatus according to claim 71, wherein the similar magnets of each of the poles of the first permanent magnet assembly are offset by a fraction of their length in the direction of motion, relative to the similar magnets in adjacent ones of the poles of the first permanent magnet assembly.

74. The apparatus according to claim 71 wherein the similar magnets of each of the poles of the second permanent magnet assembly are offset by a fraction of their length in the direction of motion, relative to the similar magnets in adjacent ones of the poles of the second permanent magnet assembly.

75. The apparatus according to claim 46 comprising a bearing structure which constrains relative motion of the first and second permanent magnet assemblies to be in the direction of motion.

76. The apparatus according to claim 71 wherein one of the first and second parts comprises a platform of a linear stage that is movably coupled to a base of the linear stage.

77. The apparatus according to claim 76 wherein the other one of the first and second parts comprises the base of the linear stage.

78. The apparatus according to claim 76 wherein the other one of the first and second parts is rigidly fastened to a stationary structure.

79. The apparatus according to claim 46 wherein the direction of motion is substantially vertical.

* * * * *

UNITED STATES PATENT AND TRADEMARK OFFICE
CERTIFICATE OF CORRECTION

PATENT NO. : 11,915,863 B2
APPLICATION NO. : 17/309599
DATED : February 27, 2024
INVENTOR(S) : Jacob Daniel Bayless et al.

It is certified that error appears in the above-identified patent and that said Letters Patent is hereby corrected as shown below:

In the Claims

Column 23, Lines 38 to 45:
Claim 15 should read: The apparatus according to claim 1 wherein a first plurality of the magnetic poles of the first part are circumferentially spaced apart around a bore having a longitudinal axis extending in the direction of motion and a second plurality of the magnetic poles of the second part are circumferentially spaced apart around a longitudinal centerline of the bore and supported to project into the bore.

Column 23, Lines 46 to 52:
Claim 16 should read: The apparatus according to claim 15 wherein the first plurality of magnetic poles of the first part are provided by a number N which is four or more magnetic poles that are equally angularly spaced around the bore and the second plurality of magnetic poles of the second part are provided by N magnetic poles that are equally angularly spaced apart around the bore.

Column 23, Lines 53 to 57:
Claim 17 should read: The apparatus according to claim 16 wherein the second plurality of magnetic poles of the second part are rotatable relative to the first plurality of magnets of the first part about a rotation axis that is concentric with the bore.

Column 24, Lines 34 to 35:
Claim 27 should read: The apparatus according to claim 24 wherein the backing member comprises a metal plate.

Column 24, Lines 36 to 37:
Claim 28 should read: The apparatus according to claim 24 wherein the backing member comprises nickel plated steel.

Signed and Sealed this
Twentieth Day of August, 2024

Katherine Kelly Vidal
*Director of the United States Patent and Trademark Office*

Column 24, Lines 41 to 45:
Claim 30 should read: The apparatus according to claim 1 wherein a force applied in the direction of motion on the second part as a result of interaction of magnetic fields from the permanent magnets of the first and second parts is constant over a range of motion of the stage within ±10%.

Column 26, Lines 22 to 25:
Claim 49 should read: The apparatus according to claim 46 wherein the first part, the second part or both the first and second parts include a ferromagnetic backing structure located behind the corresponding first or second array.